(12) United States Patent  (10) Patent No.: US 8,052,532 B2
Umaki et al.  (45) Date of Patent: Nov. 8, 2011

(54) INFORMATION PROCESSING METHOD AND SERVER SYSTEM

(75) Inventors: Takashi Umaki, Saitama (JP); Kunihiko Minakata, Yokohama (JP); Kazuo Takahashi, Tokyo (JP); Hironori Ikeda, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 469 days.

(21) Appl. No.: 12/368,664

(22) Filed: Feb. 10, 2009

(65) Prior Publication Data

US 2009/0209334 A1    Aug. 20, 2009

(30) Foreign Application Priority Data

Feb. 14, 2008   (JP) ................................ 2008-033849

(51) Int. Cl.
*A63F 9/24*   (2006.01)
(52) U.S. Cl. ............... 463/42; 463/40; 463/41
(58) Field of Classification Search ............... 463/40–42
See application file for complete search history.

(56) References Cited

U.S. PATENT DOCUMENTS

| | | | | |
|---|---|---|---|---|
| 2002/0086733 | A1* | 7/2002 | Wang | 463/42 |
| 2005/0164792 | A1* | 7/2005 | Wilcock | 463/42 |
| 2006/0094488 | A1 | 5/2006 | Smith | |
| 2007/0156267 | A1* | 7/2007 | Nozaki | 700/91 |
| 2008/0176619 | A1* | 7/2008 | Kelly et al. | 463/16 |

FOREIGN PATENT DOCUMENTS

| | | |
|---|---|---|
| DE | 100 53 735 A1 | 5/2001 |
| JP | A-2006-006853 | 1/2006 |

OTHER PUBLICATIONS

Tekken-Net, *Coin Operated Videogame Magazine Arcadia*, No. 91, p. 25, Dec. 1, 2007 (with translation).
Tekken-Net, *Coin Operated Video Magazine Arcadia*, No. 92, p. 49, Jan. 1, 2008 (with translation).
New U.S. Patent Application filed Feb. 10, 2009, filed in the name of Takashi Umaki et al.
Tekken-Newsletter, *Coin Operated Video Magazine Arcadia*, No. 92, p. 49, Jan. 1, 2008, (with translation).
Jul. 15, 2011 Office Action issued in U.S. Appl. No. 12/368,613.

* cited by examiner

*Primary Examiner* — N Drew Richards
*Assistant Examiner* — Yu-Hsi D Sun
(74) *Attorney, Agent, or Firm* — Oliff & Berridge, PLLC

(57) ABSTRACT

A league is formed by a given number of teams formed by a plurality of players and having an identical team level, and the teams compete for league ranking based on team points obtained in a given period. A team level of each team is changed based on the league ranking. A player plays a game using a game device to obtain the team points. When the number of teams is less than the given number when forming a league, a mirror team of the team that belongs to another league is added. The team points of the mirror team are calculated separately from the team points of the actual team to determine league ranking in the league of the mirror team. The team level of the actual team of the mirror team is changed based on the league ranking of the actual team and the league ranking of the mirror team.

10 Claims, 37 Drawing Sheets

* TEAM POINTS=(BASE POINTS) × N+(TRIAL POINTS)

FIG. 18

- TEAM COMMAND SCREEN

LEAGUE SERIES

TEAM COMMAND

◆ CURRENT VOTE STATUS

- ATTACK: X %

ATTACK TEAM B: X %

ATTACK TEAM C: X %

ATTACK TEAM D: X %

ATTACK TEAM E: X %

- INTERCEPT: X %

- BOOST: X %

- VOTE FOR COMMAND

RETURN

FIG. 24

· TRIAL DESCRIPTION SCREEN 1

| TRIAL |
|---|
| TRIAL DESCRIPTION |
| ◆ TRIAL 1 ..................... · (EXPLANATION OF TRIAL 1) .................... CHALLENGE THIS TRIAL? CHALLENGE RETURN |

FIG. 25

· TRIAL DESCRIPTION SCREEN 2

| TRIAL |
|---|
| TRIAL DESCRIPTION |
| ◆ TRIAL 1 ..................... · (EXPLANATION OF TRIAL 1) .................... CANCEL TRIAL IN PROGRESS, AND CHALLENGE THIS TRIAL? CHALLENGE RETURN |

FIG. 28

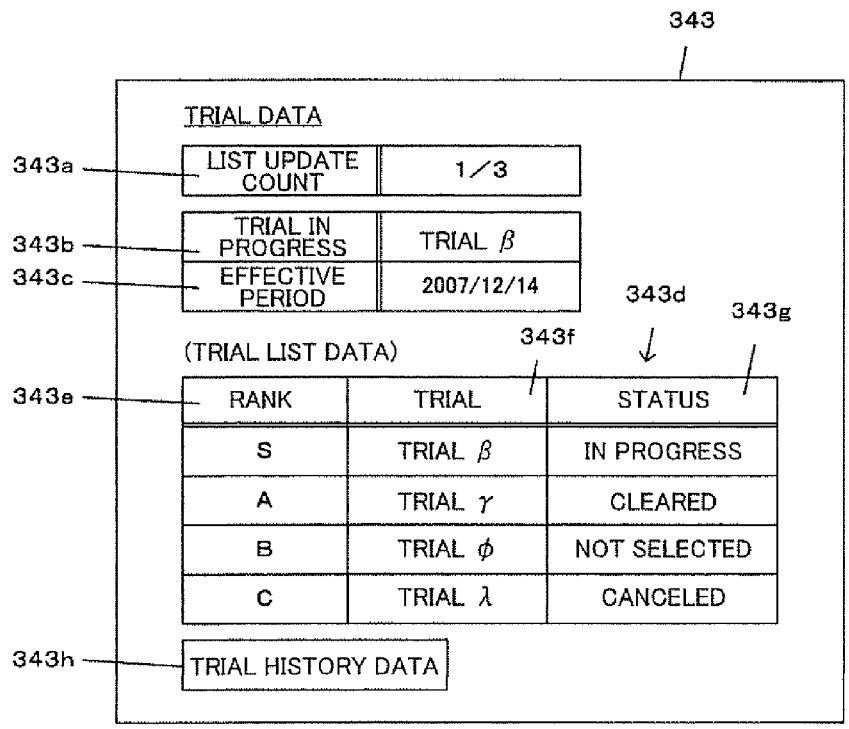

FIG. 29

| TRIAL ID | TRIAL NAME | CLEAR CONDITION | RANK |
|---|---|---|---|
| t001 | SUPERSESSION ! | DEFEATS ANOTHER PLAYER HAVING LEVEL HIGHER THAN PLAYER BY THREE OR MORE LEVELS | S |
| t002 | STORE CHAMPION ! | DEFEATS PLAYER HAVING THE MAXIMUM LEVEL IN STORE | S |
| ⋮ | ⋮ | ⋮ | |
| t101 | COMBO EXPERT | SUCCEEDS IN COMBO α FIVE TIMES | A |
| ⋮ | ⋮ | ⋮ | |
| t201 | JUST BEFORE TIME-OUT | WINS GAME WITHIN 10 SECONDS BEFORE GAME OVER | B |
| ⋮ | ⋮ | ⋮ | |
| t301 | KNOCKOUT | KNOCKOUT BY HITTING | C |
| ⋮ | ⋮ | ⋮ | |

363a: TRIAL LIST TABLE
363, 363b, 363c, 363d

FIG. 32

MIRROR LEAGUE DATA

348a — | LEAGUE ID | R12345 |

(MATCH RECORD DATA)

348c —

| INTERVAL | | TEAM POINTS | INTERVAL RANKING |
|---|---|---|---|
| MONDAY | DAYTIME | 94 | FOURTH |
| | NIGHT-TIME | 327 | THIRD |
| TUESDAY | DAYTIME | 65 | FOURTH |
| | NIGHT-TIME | — | — |
| ⋮ | ⋮ | ⋮ | ⋮ |
| SUNDAY | DAYTIME | — | — |
| | NIGHT-TIME | — | — |
| ENTIRE INTERVAL | | (CUMULATIVE VALUE) | (FINAL RANKING) |

(PARTICIPATING TEAM DATA)

348g —

| TEAM | TEAM TYPE | DISPLAY TEAM NAME |
|---|---|---|
| TEAM χ | ACTUAL TEAM | TEAM B |
| TEAM ε | ACTUAL TEAM | TEAM C |
| TEAM π | ACTUAL TEAM | TEAM D |
| TEAM ρ | ACTUAL TEAM | TEAM E |

FIG. 35

COMMAND RELATIVE RELATIONSHIP TABLE 361

| TEAM COMMAND | SUCCESS/FAILURE CONDITION | RESULT | CHANGE TARGET TEAM | CALCULATION COEFFICIENT N |
|---|---|---|---|---|
| ATTACK | TARGET TEAM ATTACKS ANOTHER TEAM | SUCCESS | TARGET TEAM | 0.75 |
| | ATTACKED BY TARGET TEAM | FAILURE | PLAYER'S TEAM | 0.7 |
| | INTERCEPTED BY TARGET TEAM | FAILURE | PLAYER'S TEAM | 0.5 |
| INTERCEPT | ATTACKED BY ANOTHER TEAM | SUCCESS | ATTACKED TEAM | 0.7 |
| | NOT ATTACKED BY ANOTHER TEAM | FAILURE | PLAYER'S TEAM | 0.9 |
| BOOST | NOT ATTACKED BY ANOTHER TEAM | SUCCESS | PLAYER'S TEAM | 1.2 |
| | ATTACKED BY ANOTHER TEAM | FAILURE | PLAYER'S TEAM | 0.7 |

FIG. 36

LEAGUE DATA 351

| LEAGUE ID | TEAM | TEAM TYPE | TEAM LEVEL |
|---|---|---|---|
| R1111 | TEAM α | ACTUAL TEAM | 5 |
| | TEAM β | ACTUAL TEAM | 5 |
| | TEAM γ | ACTUAL TEAM | 5 |
| | TEAM θ | ACTUAL TEAM | 5 |
| | TEAM φ | MIRROR TEAM | 5 |
| ⋮ | ⋮ | ⋮ | ⋮ |

FIG. 37

LEAGUE POINT TABLE (362a, 362)

| LEAGUE RANKING | CHANGE IN LEAGUE POINTS | |
|---|---|---|
| | ACTUAL TEAM | MIRROR TEAM (362b) |
| FIRST | +3 | +2 |
| SECOND | +1 | 0 |
| THIRD | 0 | 0 |
| FOURTH | −1 | 0 |
| FIFTH | −2 | −1 |

FIG. 38

FIGHT MONEY TABLE (365a, 365)

| LEAGUE RANKING | TEAM LEVEL (365b) | FIGHT MONEY (365c) |
|---|---|---|
| FIRST | 5 | 3000G |
| | 6 | 3200G |
| | 7 | 3500G |
| | ⋮ | ⋮ |
| | 10 | 6000G |
| SECOND | 5 | 2800G |
| | 6 | 2500G |
| | ⋮ | ⋮ |
| ⋮ | ⋮ | ⋮ |
| FIFTH | 5 | 1000G |
| | 6 | 1200G |
| | ⋮ | ⋮ |

FIG. 40

| | 21 | |
|---|---|---|
| | CARD DATA | |
| 21a | CARD ID | C56789 |
| | (PLAYER DATA) | |
| 21b | PLAYER ID | P12345 |
| 21c | PLAYER NAME | ○○○○ |
| 21d | PLAYER LEVEL | 14 |
| 21e | PLAYER POINTS | 2451 |
| 21f | FIGHT MONEY | 6509G |
| 21g | TEAM | TEAM α |
| 21h | PLAYER CHARACTER DATA | |

FIG. 41

BASE POINT TABLE (181)

(MATCH POINT TABLE) (181b, 181a, 181c)

| MATCH TYPE | MATCH POINTS |
|---|---|
| CPU MATCH | 5 |
| PLAYER MATCH | 10 |

(WIN POINT TABLE) (181e, 181f, 181d)

| RELATIVE LEVEL DIFFERENCE | WIN POINTS |
|---|---|
| +3 OR MORE | 50 |
| +2 | 40 |
| +1 | 30 |
| 0 | 20 |
| −1 | 15 |
| −2 | 10 |
| −3 OR LESS | 5 |

*RELATIVE LEVEL DIFFERENCE = (LEVEL OF OPPONENT PLAYER) − (LEVEL OF PLAYER)

(BONUS POINT TABLE) (181h, 181i, 181g)

| WIN CONDITION | BONUS POINTS |
|---|---|
| SUCCESSIVE VICTORIES | 5 |
| KNOCKOUT | 5 |

FIG. 42

TRIAL POINT TABLE (183a, 183, 183b)

| TRIAL RANK | TRIAL POINTS |
|---|---|
| C | 100 |
| B | 200 |
| A | 300 |
| S | 500 |

INFORMATION PROCESSING METHOD AND SERVER SYSTEM

Japanese Patent Application No. 2008-33849 filed on Feb. 14, 2008, is hereby incorporated by reference in its entirety.

BACKGROUND

The present invention relates to an information processing method and a server system.

When a player plays a game using an arcade game device, the player generally enjoys only one game upon insertion of coins or tokens corresponding to a specific amount. A game system using a player ID card has been developed in order to utilize the cumulative game play of the player including the previous game play. Such a game system has become popular.

In this type of game system, a game device provided with a card reader that can read data from and write data into a player ID card and a server system are connected via a communication channel. When the player plays the game using an arbitrary game device utilizing the player ID card, player points are awarded to the player corresponding to victory or defeat and the like. The server system sums up and manages the player points corresponding to each player ID. The player is notified of nationwide ranking and the like. JP-A-2006-006853 discloses such a game system, for example.

The player enjoys only one game play when using such a game device. However, novel game playability is achieved by collecting each game play corresponding to each player to create player ranking. The correlation (connection) between game play and player ranking is widely known.

However, since player ranking connected with game play using the game device is aimed at each player, a plurality of players do not cooperate to play the game. Therefore, game playability is limited.

SUMMARY

According to one aspect of the invention, there is provided an information processing method implemented by a server system connected to a game device via a communication channel, the game device getting a player identification information and executing a game, the information processing method comprising:

performing a matching process that matches teams to which one or more players belong to form a plurality of groups, each of the plurality of groups being formed by a given number of teams.

receiving the player identification information and notification information based on game play from the game device;

performing a team competition process that allows the teams included in each of the plurality of groups to compete based on the received notification information relating to each player belonging to each of the teams; and managing a team level of each of the teams while changing the team level of each of the teams based on a ranking of the teams included in each of the plurality of groups, the ranking being results of the team competition process.

the matching process incorporating a mirror team of an actual team that belongs to another group in a group in which the number of teams is less than the given number;

the team competition process calculating the ranking of each of the teams included in each of the plurality of groups while regarding the actual team and the mirror team as different teams; and the managing of the team level changing the team level of the actual team based on the ranking of the teams included in each of a group to which the actual team belongs and a group to which the mirror team belongs when the mirror team has been incorporated.

BRIEF DESCRIPTION OF THE DRAWINGS

FIG. 18 shows an example of a team command screen.
FIG. 24 shows an example of a trial description screen.
FIG. 25 shows another example of the trial description screen.
FIG. 28 shows a data configuration example of trial data.
FIG. 29 shows a data configuration example of a trial list table.
FIG. 32 shows a data configuration example of mirror league data.
FIG. 35 shows a data configuration example of a command relative relationship table.
FIG. 36 shows a data configuration example of league data.
FIG. 37 shows a data configuration example of a league point table.
FIG. 38 shows a data configuration example of a fight money table.

FIG. 40 shows a data configuration example of card data.

FIG. 41 shows a data configuration example of a base point table.

FIG. 42 shows a data configuration example of a trial point table.

DESCRIPTION OF EXEMPLARY EMBODIMENTS

Figure 1:
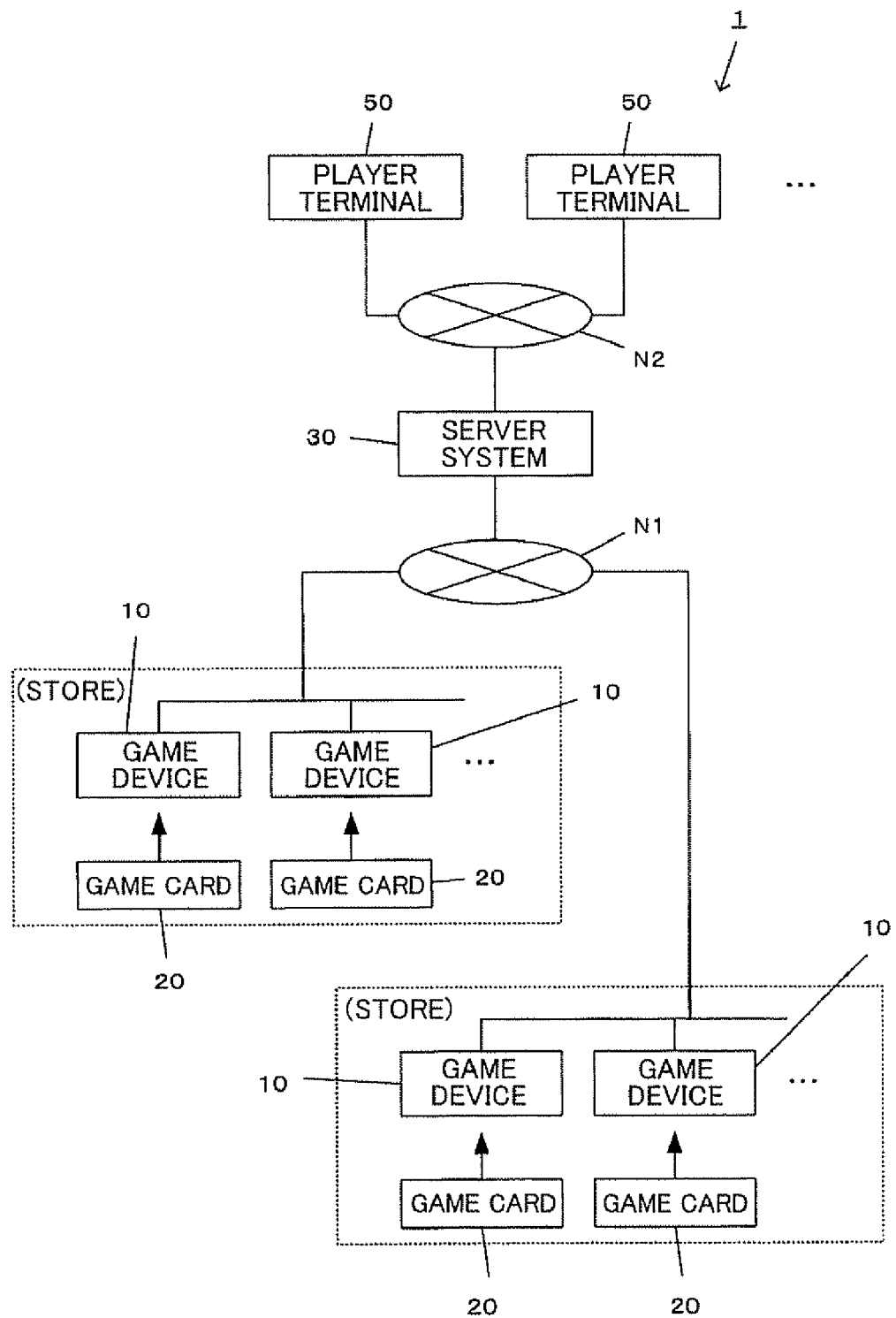
FIG. 1 is a configuration diagram showing a game system.

One embodiment of the invention relates to a server system connected to a game device via a communication channel, the game device allowing a player to input player identification information and play a game, the server system comprising:

a team management section that manages a player of each team to which one or more players belong;

a matching section that matches teams among the teams managed by the team management section to form a plurality of groups, each of the plurality of groups being formed by a given number of teams:

a reception section that receives the player identification information and notification information based on game play from the game device;

a team competition processing section that performs a team competition process that allows the teams included in each of the plurality of groups formed by the matching section to compete based on the notification information received by the reception section and relating to each player belonging to each of the teams; and a team level management section that manages a team level of each of the teams while changing the team level of each of the teams based on a ranking of the teams included in each of the plurality of groups, the ranking being results of the team competition process.

the matching section incorporating a mirror team of an actual team that belongs to another group in a group in which the number of teams is less than the given number;

the team competition processing section calculating the ranking of each of the teams included in each of the plurality of groups while regarding the actual team and the mirror team as different teams; and the team level management section changing the team level of the actual team based on the ranking of the teams included in each of a group to which the actual team belongs and a group to which the mirror team belongs when the mirror team has been incorporated.

Another embodiment of the invention relates to an information processing to method implemented by a server system connected to a game device via a communication channel, the game device allowing a player to input player identification information and play a game, the information processing method comprising:

a team management step that manages a player of each team to which one or more players belong;

a matching step that matches teams among the teams managed by the team management section to form a plurality of groups, each of the plurality of groups being formed by a given number of teams:

a reception step that receives the player identification information and notification information based on game play from the game device;

a team competition processing step that performs a team competition process that allows the teams included in each of the plurality of groups formed by the matching step to compete based on the notification information received by the reception section and relating to each player belonging to each of the teams; and a team level management step that manages a team level of each of the teams while changing the team level of each of the teams based on a ranking of the teams included in each of the plurality of groups, the ranking being results of the team competition process, the matching step incorporating a mirror team of an actual team that belongs to another group in a group in which the number of teams is less than the given number;

the team competition processing step calculating the ranking of each of the teams included in each of the plurality of groups while regarding the actual team and the mirror team as different teams; and the team level management step changing the team level of the actual team based on the ranking of the teams included in each of a group to which the actual team belongs and a group to which the mirror team belongs when the mirror team has been incorporated.

According to the above configuration, each player can enjoy game play using the game device. Moreover, the players are managed corresponding to each team, and the groups are formed by matching the teams. The teams in each group compete based on game play performed by each player belonging to each team (team competition process). The player can enjoy each game play using the game device. Moreover, team ranking in each group changes based on game play. Therefore, a system that provides game play using the game device with novel interest to improve game playability can be provided. Since the teams compete in each group formed by matching, an interesting system that strengthens the unity of the players who belong to the team can be provided.

The teams are matched so that one group is formed by the given number of teams. Therefore, the number of players of a group may be less than the given number. According to the invention, this problem can be solved. Specifically, since the mirror team of the actual team that belongs to another group is incorporated in a group in which the number of teams is less than the given number, and the ranking of each team included in each group is calculated while regarding the actual team and the mirror team as different teams, the above problem can be solved. The team level of each team is affected by the results of the team competition process. The team level of the actual team of the mirror team is changed based on the ranking of the teams included in each of a group to which the actual team belongs and a group to which the mirror team belongs. Therefore, the team level of the actual team incorporated in another group as the mirror team is affected by the results of the team competition process on a plurality of groups. As a result, a new interest is created.

In the above server system, the matching section may form the plurality of groups by matching the given number of teams having a team level that satisfies a given approximation condition.

According to the above configuration, the groups are formed by matching the teams having a team level that satisfies the given approximation condition. Therefore, the team competition process is performed on the teams having a similar capability. In the team competition process, the teams do not directly play a match. Specifically, the teams indirectly compete based on results obtained by collecting game play performed by each player using the game device corresponding to each team. Therefore, since the teams indirectly compete based on game play performed by each player belonging to each team, an interesting competition can be implemented.

In the above server system, a series of processes including matching by the matching section and the team competition process by the team competition processing section may be repeated at given intervals.

According to the above configuration, a series of processes including matching and the team competition process is repeated at given intervals. Therefore, opponent teams are matched and changed corresponding to each period (interval) so that the player can continuously enjoy competition between the teams in the group.

In the above server system, the game device may include a point calculation section that calculates determination points based on game play results by a predetermined calculation process;

the notification information may include at least the determination points calculated by the point calculation section; and the team competition processing section may calculate the ranking of each of the teams in each of the plurality of groups based on a sum of the determination points included in the notification information corresponding to each of the teams.

According to the above configuration, the determination points are calculated by the game device from the game play results and transmitted to the server system, and the ranking of each team in the group is determined based on the determination points of each team.

The above server system may further comprise:

a team command selection section that selects a team command corresponding to each of the teams from a plurality of team commands for which a success/failure relative relationship has been specified;

a calculation coefficient setting section that variably sets a calculation coefficient based on team commands for each team that belongs to an identical group among the team commands corresponding to each of the teams selected by the team command selection section and the success/failure relative relationship, the calculation coefficient being used when the point calculation section of the game device calculates the determination points based on game play results; and a calculation coefficient transmission section that transmits the calculation coefficient set by the calculation coefficient setting section to the game device, the point calculation section of the game device may calculate the determination points of the actual team and the mirror team;

the calculation coefficient setting section may set the calculation coefficient of each of the teams that belong to a group including the mirror team while regarding the team command for the mirror team as the same as the team command for the actual team of the mirror team;

the calculation coefficient transmission section may transmit the calculation coefficients of the actual team and the mirror team; and the team competition processing section may calculate the ranking of each of the teams included in each of the plurality of groups based on the determination points of the actual team and the mirror team.

According to the above configuration, the calculation coefficient used when calculating the determination points based on game play results is changed based on the relative relationship between the team commands for the teams selected from the plurality of team commands for which the success/failure relative relationship has been specified. This implements a more interesting game in which the determination points are not merely calculated based on game play results.

The calculation coefficient of each team that belongs to a group in which the mirror team is incorporated is set while regarding the team command for the mirror team as the same as the team command for the actual team of the mirror team, and the determination points of the mirror team are calculated separately from the determination points of the actual team of the mirror team. The ranking of each team included in each group is calculated based on the determination points of the actual team and the mirror team. Specifically, the mirror team is not nominally incorporated as a dummy team. The calculation coefficient and the determination points of the mirror team are calculated separately from those of the actual team. Therefore, the determination points have a realistic value that allows competition in the group in which the mirror team is incorporated.

In the above server system, the team competition processing section may include a point calculation section that calculates determination points based on the notification information by a predetermined calculation process, and may calculate the ranking of each of the teams in each of the plurality of groups based on a sum of the determination points calculated by the point calculation section.

According to the above configuration, the determination points are calculated based on the notification information calculated based on game play and transmitted from the game device, and the ranking of each team in the group is determined based on the sum of the determination points corresponding to each team.

The above server system may further comprise:

a team command selection section that selects a team command corresponding to each of the teams from a plurality of team commands for which a success/failure relative relationship has been specified; and a calculation coefficient setting section that variably sets a calculation coefficient based on team commands for each team that belongs to an identical group among the team commands corresponding to each of the teams selected by the team command selection section and the success/failure relative relationship, the calculation coefficient being used when the point calculation section of the game device calculates the determination points, the point calculation section may calculate the determination points of the actual team and the mirror team;

the calculation coefficient setting section may set the calculation coefficient of each of the teams that belongs to a group including the mirror team while regarding the team command for the mirror team as the same as the team command for the actual team of the mirror team; and the team competition processing section may calculate the ranking of each of the teams included in each of the plurality of groups based on the determination points of the actual team and the mirror team.

According to the above configuration, the calculation coefficient used when calculating the determination points is changed based on the relative relationship between the team commands for the teams selected from the plurality of team commands for which the success/failure relative relationship has been specified. This implements a more interesting game in which the determination points are not merely calculated based on the notification information.

The calculation coefficient of each team that belongs to a group in which the mirror team is incorporated is set while regarding the team command for the mirror team as the same as the team command for the actual team of the mirror team, and the determination points of the mirror team are calculated separately from the determination points of the actual team of the mirror team. The ranking of each team included in each group is calculated based on the determination points of the actual team and the mirror team. Specifically, the mirror team is not nominally incorporated as a dummy team. The calculation coefficient and the determination points of the mirror team are calculated separately from those of the actual team. Therefore, the determination points have a realistic value that allows competition in the group in which the mirror team is incorporated.

In the above server system, the team command selection section may select the team command of each of the teams by a majority decision of the players belonging to each of the teams based on vote signals transmitted from player terminals of the players belonging to each of the teams.

According to the above configuration, the team command of each team is selected by a majority decision based on the vote signals transmitted from the player terminals of the players belonging to each team.

Therefore, the team command can be selected as a consensus of the team.

In the above server system, the team competition processing section may include a subtotal section that calculates a subtotal of the determination points corresponding to each team at intervals shorter than the given intervals; and the server system may further comprise a transmission section that transmits a signal to the game device, the signal displaying a sum of the determination points on the game device in a latest interval in which the subtotal section calculates the subtotal of the determination points corresponding to each team in the group to which the team of a player identified by a player identification signal received by the player identification information reception section belongs as the actual team and/or the mirror team.

According to the above configuration, the player can be notified of the team competition process using the game device used to play the game. However, the cumulative value of the determination points of each team in the group is not displayed. Specifically, the determination points in the latest interval which is shorter than the given intervals of the team competition processes and in which the subtotal of the determination points is calculated are displayed. Specifically, the player can be notified of the point status of each team in the current interval, but cannot be notified of the total points obtained over the entire period in which the team competition process is performed. If the total points obtained over the entire period are displayed, the morale of the team may fall depending on the point difference. Moreover, the player may not enjoy each game play using the game device. As the sum of the determination points to be displayed, either or both of the sum of the determination points of the actual team and the sum of the determination points of the mirror team may be displayed.

According to the invention, each player can enjoy game play using the game device. Moreover, the groups are formed by matching the teams, and the teams in each group compete based on the game play of each player that belongs to each team (team competition process). The player can enjoy each game play using the game device. Moreover, team ranking in each group changes based on game play. Therefore, a system that provides game play using the game device with novel interest to improve game playability can be provided. Since the teams compete in each group formed by matching, an interesting system that strengthens the unity of the players who belong to the team can be provided.

The teams are matched so that one group is formed by the given number of teams. In this case, the mirror team of the actual team that belongs to another group is incorporated in a group in which the number of teams is less than the given number, and the ranking of each team included in each group is calculated while regarding the actual team and the mirror team as different teams. The team level of each team is affected by the results of the team competition process. The team level of the actual team of the mirror team is changed based on the ranking of the teams included in each of a group to which the actual team belongs and a group to which the mirror team belongs. Therefore, the team level of the actual team incorporated in another group as the mirror team is affected by the results of the team competition process on a plurality of groups. As a result, a new interest is created.

Preferred embodiments of the invention are described below with reference to the drawings. The following description illustrates an example in which a fighting game is executed in a network game system. Note that embodiments to which the invention can be applied are not limited thereto.

Configuration

FIG. 1 is a configuration diagram showing a game system 1 according to one embodiment of the invention. As shown in FIG. 1, the game system 1 is a network game system that includes a plurality of game devices 10, a server system 30, and a player terminal 50. The server system 30 and the game device 10 are connected via a communication line N1 so that the server system 30 and the game device 10 can communicate. The server system 30 and the player terminal 50 are connected via a communication line N1 so that the server system 30 and the player terminal 50 can communicate. The communication lines N1 and N2 are communication channels through which data can be exchanged. Specifically, the communication lines N1 and N2 include a communication network such as a LAN using a private line (private cable) for direct connection, Ethernet (registered trademark), and the like, a telecommunication network, a cable network, and the Internet. The communication method may be a cable communication method or a wireless communication method. The communication lines N1 and N2 may be different communication networks or an identical communication network.

The game device 10 is a terminal device that allows the player to play the game. Specifically, the game device 10 is an arcade game device installed in a store such as an arcade. The game devices 10 installed in an identical store are connected via a LAN or the like created in the store. The game device 10 reads a card ID recorded in a game card 20 inserted into a housing, transmits the card ID to access the server system 30, and logs into the game system 1. The game card 20 is provided to the player in advance by selling or the like. For example, the game card 20 is implemented by an IC card that includes an IC chip that stores data such as a specific card ID.

The server system 30 is a server system formed by a server computer. For example, the server system 30 is installed in facilities of the game manufacturer. The server system 30 mainly functions (1) as a game server that manages the game in the game system 1, and (2) as a web server that provides the player who has registered the game card 20 used in the game with a service connected (associated) with the game executed in the game system 1 on a homepage (HP) via the Internet. Note that the server system 30 may include a plurality of server computers.

The player terminal 50 is a terminal device that allows the player to enjoy the service provided by the server system 30. Specifically, the player terminal 50 is a portable telephone or a personal computer possessed by the player. The player can enjoy the service provided by the server system 30 by starting a browser program and accessing the homepage maintained by the server system 30 using the player terminal 50.

Principle

The game system 1 executes a fighting game. In the fighting game, the player can enjoy a "player match" in which the player plays a match against another player who enjoys the game in the store and a "CPU match" in which the player plays a match against a CPU character. The player obtains player points and fight money corresponding to the results of game play using the game device 10. The term "fight money" refers to virtual money for the player to purchase clothes, accessories, and the like used to customize a player character. The term "player points" refers to a value that ranks the player. Player ranking is calculated based on the sum of the player points obtained by each player.

In this embodiment, a team is formed by one or more players, and team ranking is calculated corresponding to each team. Team ranking is calculated based on the sum of team points obtained by the players of each team. The team points are obtained corresponding to the results of game play performed by the player. The team points are calculated according to a standard differing from that for the player points. Specifically, the player obtains fight money, the player points for the player, and the team points for the player team as a result of game play.

Figure 2:
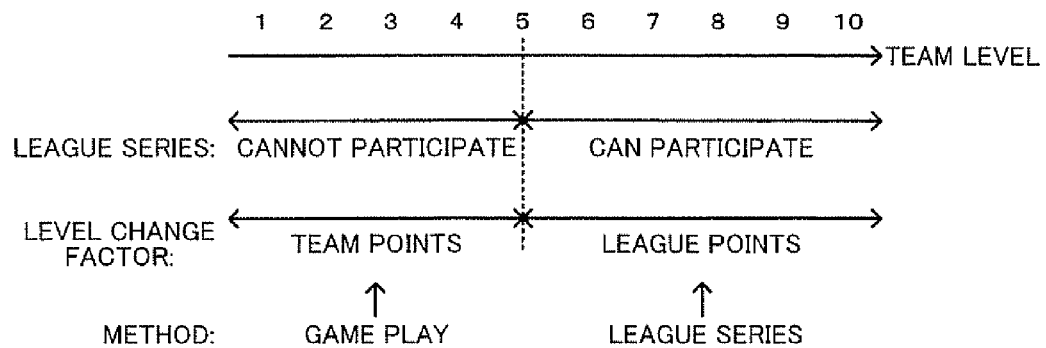
FIG. 2 is a view illustrative of a change in team level.

A level (team level) is specified corresponding to each team. The team level is changed between the lowest level "1" and the highest level "10". FIG. 2 is a view illustrative of a change in team level. As shown in FIG. 2, when the team level is between "1" and "5", the team level is changed corresponding to the sum of the team points obtained. The team points obtained by the player have a positive value. Specifically, the sum of the team points of each team necessarily increases. Therefore, the team level is increased up to "5". When the team level has reached "5", the team can participate in a league series, and the team level is changed corresponding to league points that are changed corresponding to the results in the league series. The league points are increased or decreased corresponding to the team's results in the league series. Therefore, the team level is increased or decreased between "5" and "10". Note that the team level is not decreased to a value less than "5" after the team level has reached "5".

Figure 3:
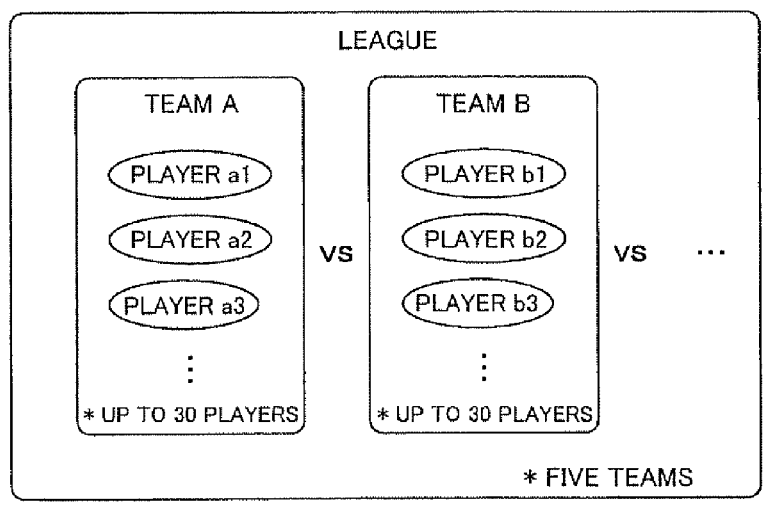
FIG. 3 is a view showing an outline of a league series.

FIG. 3 is a view illustrative of an outline of the league series. As shown in FIG. 3, a league is formed by combining a given number of (e.g., five) teams. Each team in the league is ranked based on the sum of the team points obtained by the players of each team.

Figure 4:
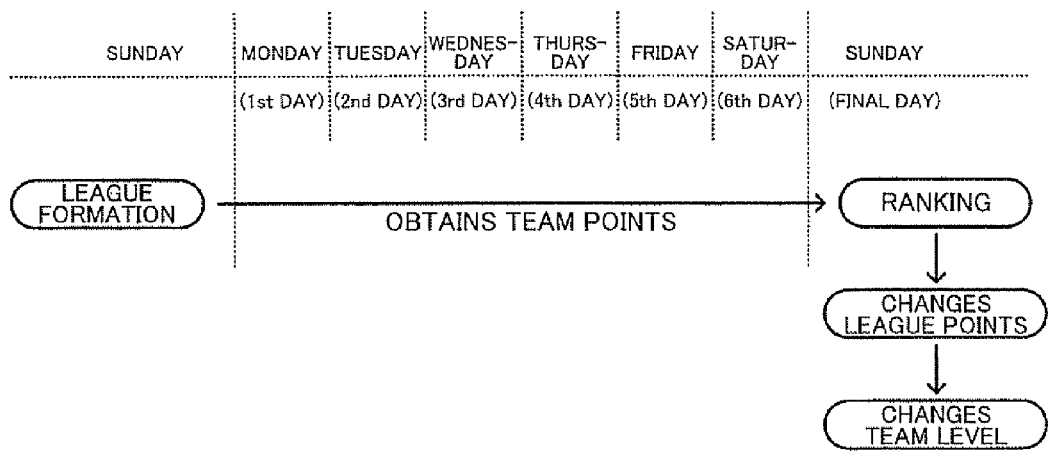
FIG. 4 is a view illustrative of a league series period.

The league series is held over a predetermined unit period (e.g., one week). FIG. 4 is a view illustrative of an outline of the league series period. As shown in FIG. 4, the league series is held over one week (seven days) from Monday to Sunday. Specifically, the league is formed on Sunday. The player plays the game from the next day (Monday) to Sunday to obtain team points. Ranking (league ranking) is determined on Sunday (final day) based on the sum of the team points obtained one week (series period). The league points of each team are changed corresponding to league ranking, and the team level is changed corresponding to the change in league points.

Figure 6A:
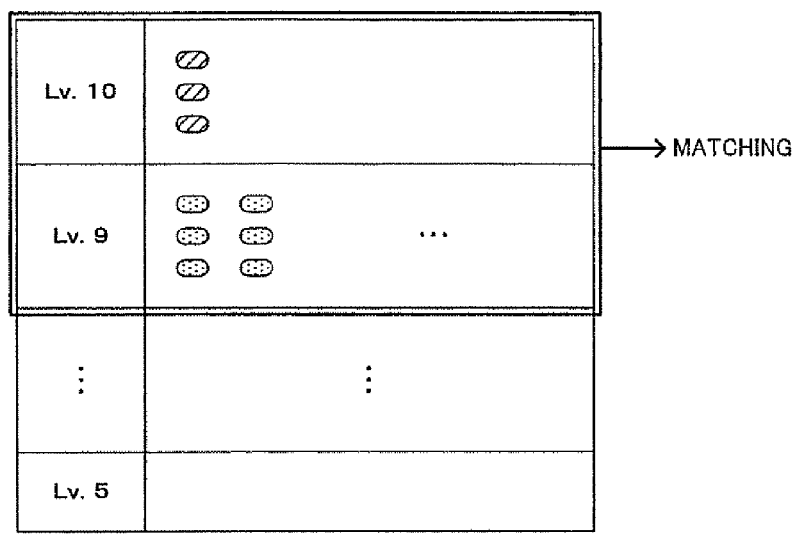
FIG. 6A is another view illustrative of league formation.
Figure 6B:
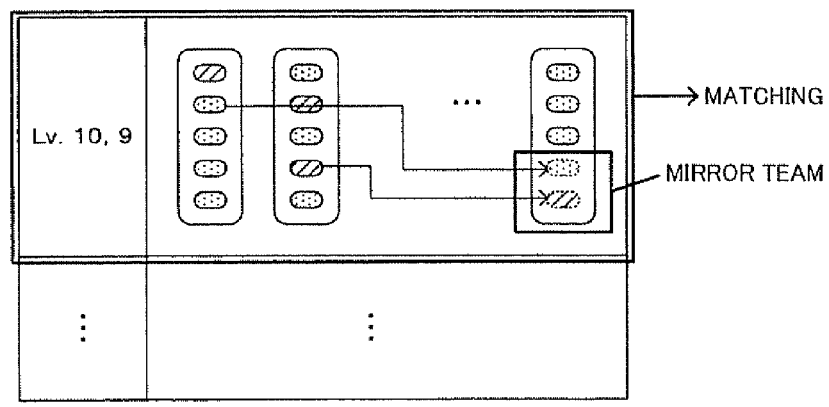
FIG. 6B is another view illustrative of league formation.
Figure 7:
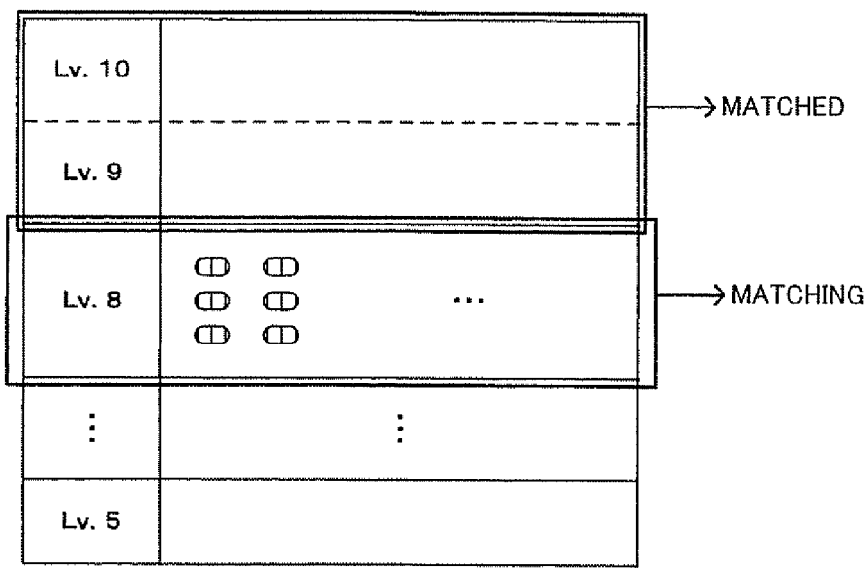
FIG. 7 is a further view illustrative of league formation.
Figure 8:
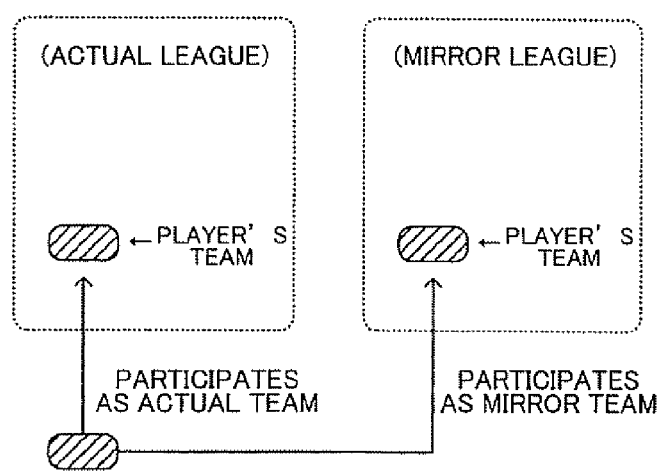
FIG. 8 is a view illustrative of an actual league and a mirror league.

FIGS. 5 to 7 are views illustrative of league formation. The league is formed by five or more teams having a team level equal to or higher than "5" (i.e., teams that can participate in the league series). The league is basically formed by five teams having an identical team level. When the number of teams having an identical team level is less than five, teams having different team levels are also matched. When the number of teams having an identical team level is five or more, but some teams are not matched since the number of teams is not a multiple of five, mirror teams of the teams having an identical team level that have been matched are additionally provided so that one league is necessarily formed by five teams. The term "mirror team" refers to a team created based on a given original team (hereinafter referred to as "actual team") to have the same team level as that of the original team.

Figure 5A:
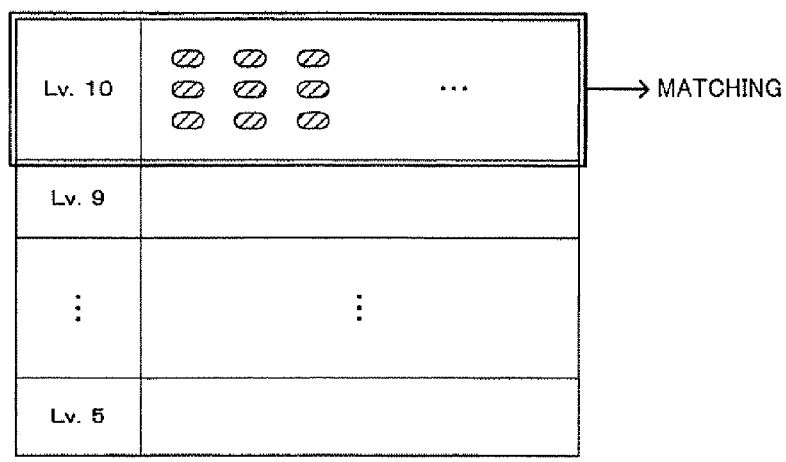
FIG. 5A is a view illustrative of league formation.
Figure 5B:
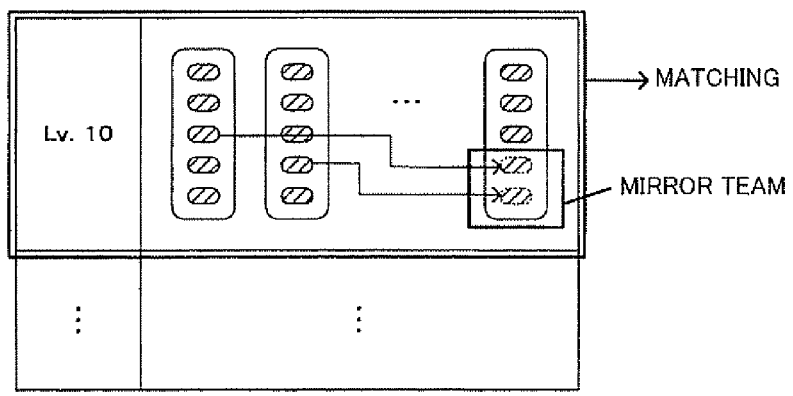
FIG. 5B is another view illustrative of league formation.

As shown in FIG. 5A, one league is formed by matching five teams among teams that can participate in the league series and have the maximum team level "10" as a target group. When three teams remain unmatched (see FIG. 5B), mirror teams of the teams that are included in the target group and have been matched are added so that a group can be formed by five teams.

As shown in FIG. 6A, when the number of teams having the team level "1" (i.e., target group) is three, teams having the team level "9" are added to the target group for matching. When three teams remain unmatched (see FIG. 6B), mirror teams of the teams that are included in the target group and have been matched are added so that a group can be formed. When the teams included in the target group have been matched, teams having the team level "8" are similarly matched as the target group, as shown in FIG. 7.

Specifically, teams having an identical team level are matched in the order from teams that can participate in the league series and have the maximum team level "10" to teams that can participate in the league series and have the lowest team level "5". The teams are matched in the order from teams having a higher team level because the number of teams decreases as the team level increases. Specifically, teams having a team level at which the number of teams is small so that teams having different team levels may be matched are matched first, and teams having a team level at which the number of teams is large so that a league may be formed by matching teams having that team level are matched thereafter.

Therefore, a league that includes only actual teams and a league that includes actual teams and mirror teams are formed. Specifically, one team may participate in a league in which the team participates as the actual team (hereinafter referred to as "actual league") and a league in which the team participates as the mirror team (hereinafter referred to as "mirror league").

The team points are calculated by "base points×N+trial points" corresponding to each game play using the game device 10 based on the results of game play. The base points are obtained by playing the game. The base points mainly include participation points and win points.

The calculation coefficient N is a parameter that increases or decreases the base points, and is specified corresponding to each team. The calculation coefficient N is initially set at 1.0 (initial value). The calculation coefficient N is changed corresponding to a team command issued by each team. Specifically, a plurality of types of team commands are provided, and the success/failure relative relationship between the types is defined in advance. The calculation coefficient N of each team is chanced corresponding to the success/failure relative relationship between the team commands issued by each team.

Figure 9:
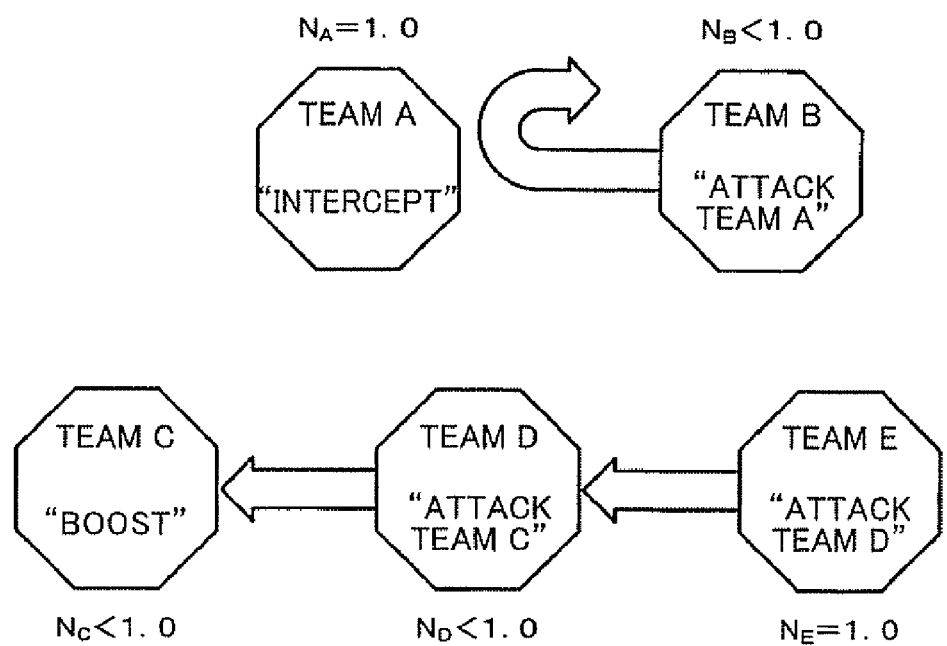
FIG. 9 is a view illustrative of the team command relative relationship.

FIG. 9 is a view showing the team command success/failure relative relationship. As shown in FIG. 9, the team commands include an attack command, an intercept command, and a boost command. The success/failure relative relationship between the team commands is defined as follows. The attack command instructs the team to attack another team. The team succeeds in operation if the team is not intercepted by the attack target team. In this case, the calculation coefficient N of the attack target team is reduced to a value less than 1.0. The team fails in operation if the team is intercepted by the attack target team. In this case, the calculation coefficient N of the team is reduced to a value less than 1.0. The intercept command instructs the team to intercept another team. The team succeeds in operation if the team is attacked by another team. In this case, the calculation coefficient N of the team that has made an attack is reduced to a value less than 1.0. The team fails in operation if the team is not attacked by another team. In this case, the calculation coefficient N of the team is reduced to a value less than 1.0. The boost command instructs the team not to expect an attack from another team. The team fails in operation if the team is not attacked by another team. In this case, the calculation coefficient N of the team is increased to a value larger than 1.0. The team fails in operation if the team is attacked by another team. In this case, the calculation coefficient N of the team is reduced to a value less than 1.0.

In FIG. 9, a team A issues the intercept command, a team B issues the attack command that instructs the team B to attack the team A, a team C issues the boost command, a team D issues the attack command that instructs the team D to attack the team C, and a team E issues the attack command that instructs the team E to attack the team D. The team A succeeds in operation since the team A has intercepted the team B that has made an attack. In this case, the calculation coefficient $N_B$ of the team B is reduced to a value less than 1.0, and the calculation coefficient $N_A$ of the team A remains unchanged (=1.0) since the team A is not attacked by another team. The team B fails in operation since the team B has been intercepted by the attack target team A. In this case, the calculation coefficient $N_B$ of the team B is reduced to a value less than 1.0. The team C fails in operation since the team C has been attacked by the team D. In this case, the calculation coefficient $N_C$ of the team C is reduced to a value less than 1.0. The team D succeeds in operation since the team D is not intercepted by the attack target team C. In this case, the calculation coefficient $N_C$ of the team C is reduced to a value less than 1.0, and the calculation coefficient $N_D$ of the team D is reduced to a value less than 1.0 since the team D has been attacked by the team E. The team E succeeds in operation since the team E is not intercepted by the attack target team D. In this case, the calculation coefficient $N_D$ of the team D is reduced to a value less than 1.0, and the calculation coefficient $N_E$ of the team E remains unchanged (=1.0) since the team E is not attacked by another team.

Figure 10:
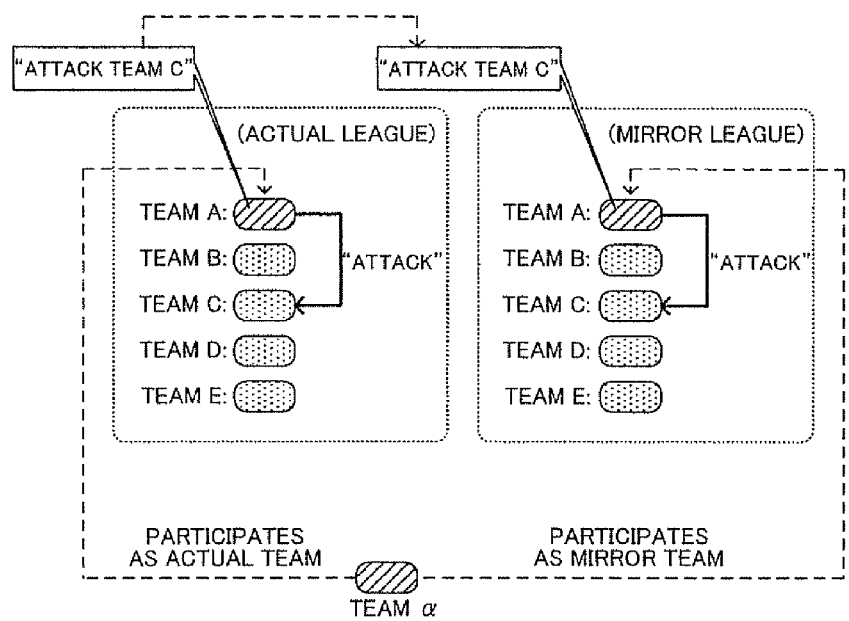
FIG. 10 is a view illustrative of a team command of a mirror team.

The league is classified as a league that includes only actual teams and a league that includes actual teams and mirror teams, as described above. In a league that includes the mirror team, the team command of the mirror team is set to be the same as the team command of the original actual team. In FIG. 10, a team α participates in the actual league as the actual team and participates in the mirror league as the mirror team, for example. In this case, when the team command of the actual team in the actual league is "attack team C", the team command of the mirror team of the team α is also "attack team C". The attack team command does not designate an actual team as the attack target, but designates one of the teams B to E assigned to the other four teams. A team assigned to one of the teams B to E is the attack target team.

Specifically, an actual league calculation coefficient N1 based on the team command relationship in the actual league and a mirror league calculation coefficient N2 based on the team command relationship in the mirror league are calculated as the calculation coefficient N of the team. The team points obtained in the actual league calculated using the calculation coefficient N1 and the team points obtained in the mirror league calculated using the calculation coefficient N2 are calculated corresponding to one game play. In the actual league, the teams are ranked based on the team points calculated using the calculation coefficient N1. In the mirror league, the teams are ranked based on the team points calculated using the calculation coefficient N2. The league points of the team are changed corresponding to ranking in the league in which the team participates as the actual team and ranking in the league in which the team participates as the mirror team.

Figure 11:
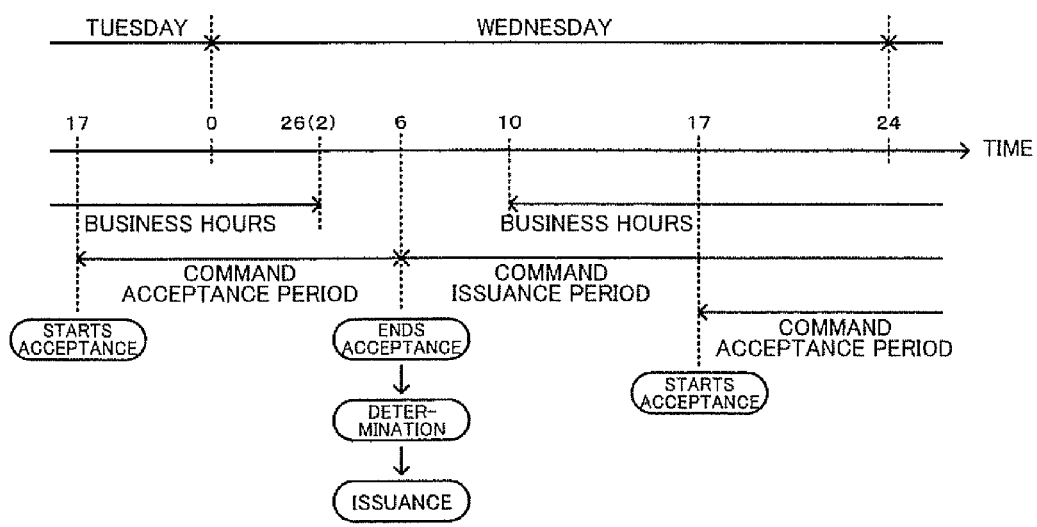
FIG. 11 is a view illustrative of issuance of a team command.

The team command is issued in day units. Specifically, the calculation coefficient N is changed in day units. FIG. 11 is a view illustrative of issuance of the team command. As shown in FIG. 11, the team command issued on one day (e.g., Wednesday) is accepted from a given time (e.g., 17:00 pm) on the previous day (e.g., Tuesday), and the acceptance of the team command is closed at a given time (e.g., 6:00 am) before business hours on that day (e.g., Wednesday). The player votes for (selects) the desired team command in a command acceptance period from the acceptance start time to the acceptance finish time. Note that one player can cast one vote. The player votes for the team command using the player terminal 50 possessed by the player. When the command acceptance period has expired, the team command of each team is determined by a majority decision of the players belonging to each team. The determined team command is then issued.

The trial points are obtained by clearing a trial (bonus point condition) defined in advance. A game play clear condition such as making a specific action in the game is specified as the trial. The trial is determined by each player. The player determines the trial using the player terminal 50 possessed by the player.

Figure 12A:
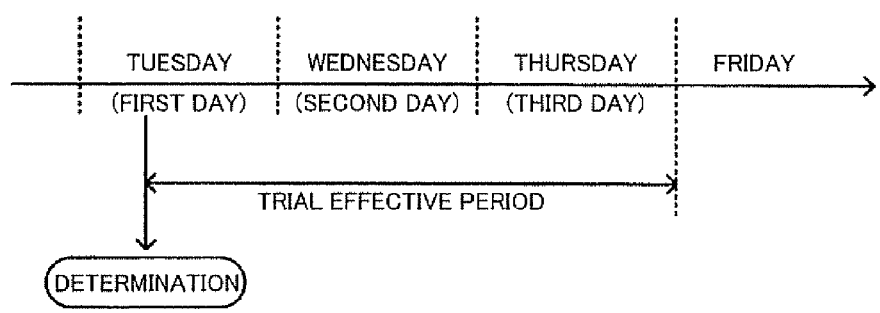
FIG. 12A is a view illustrative of a trial effective period.
Figure 12B:
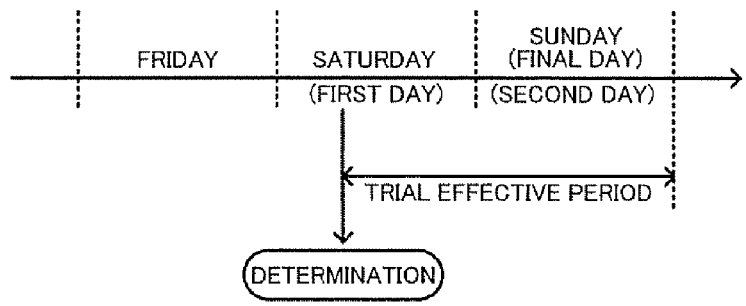
FIG. 12B is another view illustrative of the trial effective period

An effective period is set for the trial. When the player has succeeded in the trial within the effective period, the player obtains given trial points. FIGS. 12A and 12B are views illustrative of the trial effective period. As shown in FIGS. 12A and 12B, the trial effective period is specified as up to three days including the day when the player determines the trial. As shown in FIG. 12A, when the player determines the trial on Tuesday, the trial effective period is from Tuesday to Thursday, that is, the third day from Tuesday. As shown in FIG. 12B, when the player determines the trial on Saturday, the trial effective period is from Saturday to Sunday, that is, the final day of the league series.

Figure 13:
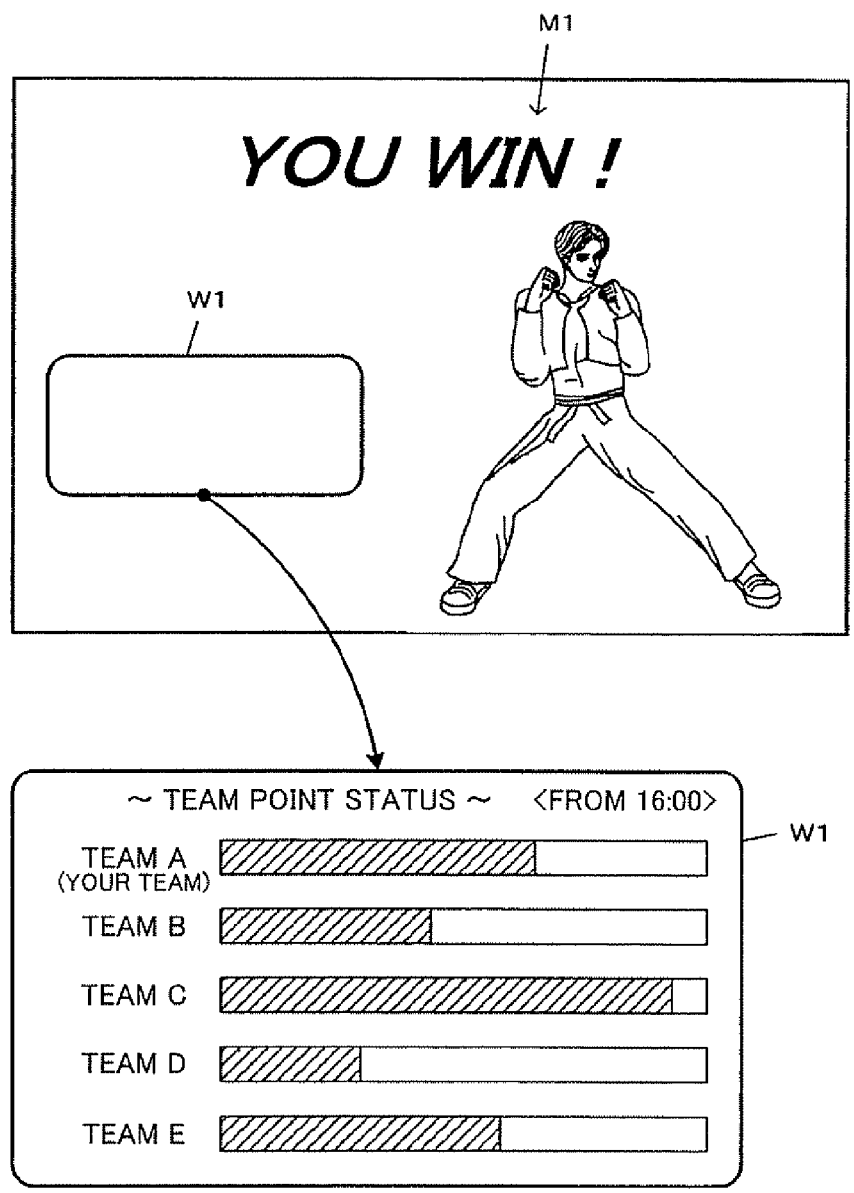
FIG. 13 shows an example of an after-match screen.

The team points obtained by each team are displayed after game play using the game device 10. FIG. 13 is a view showing an example of an after-match screen displayed on the game device 10 after game play. As shown in FIG. 13, a message M1 that indicates the match result and a team point status window W1 are displayed on the after-match screen. The current team point status of each team that participates in the actual league as the actual team is graphically displayed on the team point status window W1 (see enlarged view). In the graph, the left end is 0 points (lower limit), and the right end is 1000 points (upper limit). The team point status indicates the points obtained in one interval within the league series period.

The actual name of each team is not displayed on the team point status window W1. Specifically, each team is displayed anonymously (e.g., teams A to E). The team of the player is displayed at the top as the team A. When the mirror team is included in the league, the mirror team may be indicated, or a message that informs the player that the mirror team is included in the league may be displayed. The team point status of each team in the actual league is displayed. Note that the team point status of each team in the mirror league may also be displayed.

Figure 14:
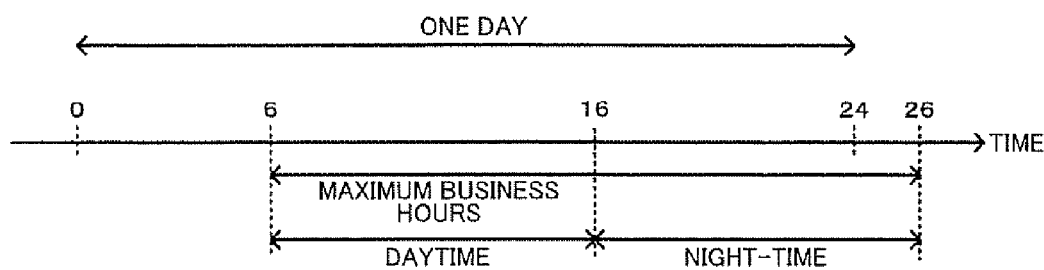
FIG. 14 is a view illustrative of an interval.

FIG. 14 is a view illustrative of the interval. As shown in FIG. 14, the interval refers to a period obtained by equally dividing the maximum business hours on one day in the league series period into the first period (daytime) and the second period (night-time). Specifically, the team point status in the latest interval including the current time is displayed on the team point status window W1 instead of the total team point status from the start of the league series. The display target interval is displayed on the team point status window W1. Therefore, the player can observe interval ranking in the current interval, but cannot observe overall ranking in the league series period.

Display Screen of Player Terminal

The operations performed by the player using the player terminal 50 are described below with reference to a display screen displayed on the player terminal 50. When the player has accessed the server system 30 using the player terminal 50, a player top screen (top page) shown in FIG. 15 is displayed, for example.

Figure 15:
FIG. 15 shows an example of a player top screen.

FIG. 15 is a view showing an example of the player top screen. As shown in FIG. 15, player data such as the player name, player ID, player ranking, play record, and team is displayed on the player top screen. The items that can be selected are underlined. When the player has selected the item "team" on the player top screen, a team top screen is displayed.

Figure 16:
FIG. 16 shows an example of a team top screen.

FIG. 16 is a view showing an example of the team top screen. As shown in FIG. 16, data relating to the team in which the player participates, such as the team name, team level, players belonging to the team, and team ranking, is displayed on the team top screen. When the player has selected the item "league series" on the team top screen, a league top screen is displayed.

Figure 17:
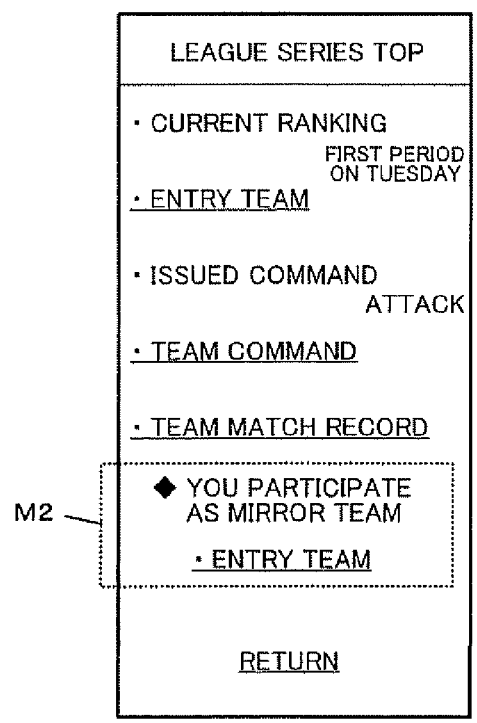
FIG. 17 shows an example of a league top screen.

FIG. 17 is a view showing an example of the league top screen. As shown in FIG. 17, data relating to the league of the team to which the player belongs, such as current interval ranking, entry team, and issued team command, is displayed on the league top screen. When the team of the player participates in another league as the mirror team, a message M2 that informs the player that the team of the player participates in another league as the mirror team, and teams that participate in that league, are also displayed. When the player has selected the item "team command" on the league top screen, a team command screen is displayed.

FIG. 18 is a view showing an example of the team command screen. As shown in FIG. 18, the current vote status of each team command of the team is displayed on the team command screen. When the player has selected the item "command vote" on the team command screen, a command vote screen is displayed.

Figure 19:
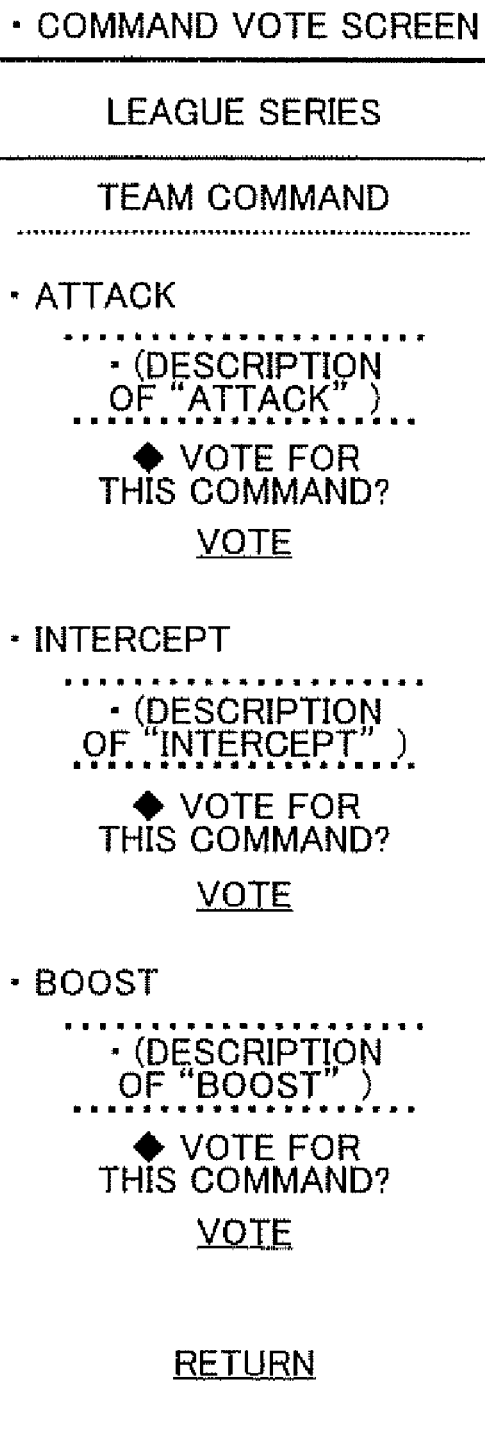
FIG. 19 shows an example of a command vote screen.

FIG. 19 is a view showing an example of the command vote screen. As shown in FIG. 19, a detailed explanation of each team command and a message that asks the player whether or not to vote for each command are displayed on the command vote screen. The player votes for an arbitrary team command by selecting the item "vote" on the team command screen. The team command screen that reflects the vote results is then displayed. In this example, when the player has already voted for one team command, the team command is changed to the team command for which the player has currently voted. Note that the team command may not be changed.

Figure 20:
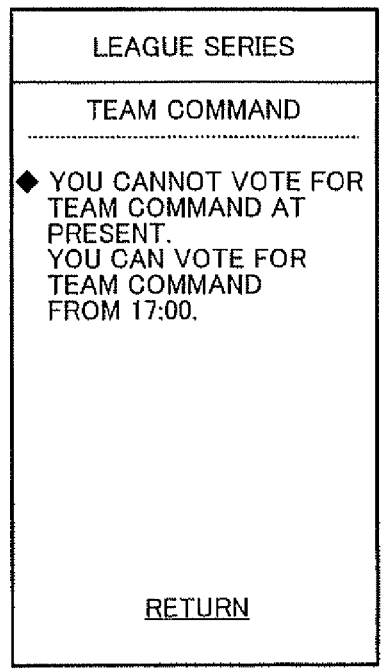
FIG. 20 shows an example of a command vote unavailable screen.

When the player has selected the item "team command" on the league top screen (see FIG. 17) in a period other than the team command acceptance period, a command vote unavailable screen is displayed. FIG. 20 is a view showing an example of the command vote unavailable screen. As shown in FIG. 20, a message that notifies the player that the player cannot vote for the team command outside the command acceptance period is displayed on the command vote unavailable screen.

Figure 21:
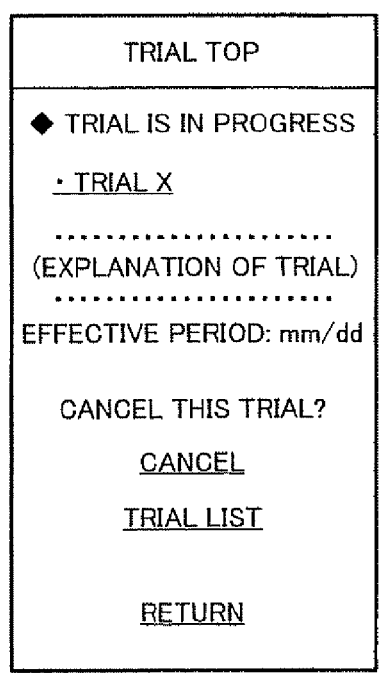
FIG. 21 shows an example of a trial top screen.
Figure 22:
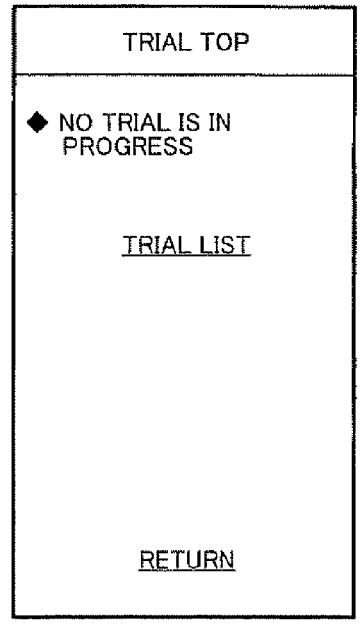
FIG. 22 shows another example of the trial top screen.

When the player has selected the item "trial" on the player top screen (see FIG. 15), a trial top screen is displayed. FIG. 21 is a view showing an example of the trial top screen. As shown in FIG. 21, a detailed explanation and the effective period of the trial and a message that asks the player whether or not to cancel the trial are displayed on the trial top screen. When the player has selected the item "cancel" on the trial top screen, the trial is canceled. After a message that notifies the player that the trial has been canceled has been displayed, a trial top screen shown in FIG. 22 is displayed.

Figure 23:
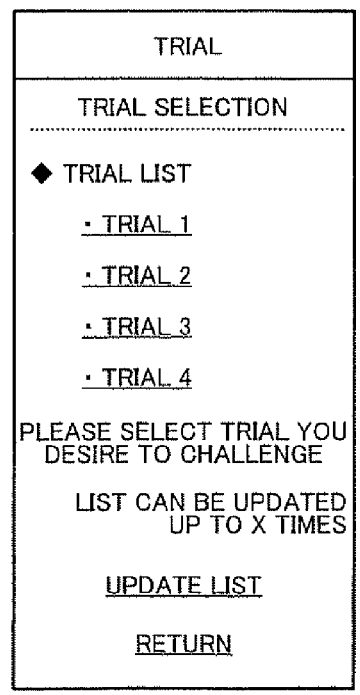
FIG. 23 shows an example of a trial list screen.

FIG. 23 is a view showing another example of the trial top screen. As shown in FIG. 23, a message that notifies the player that no trial is in progress is displayed on the trial top screen. When the player has selected the item "trial" on the player top screen (see FIG. 15) when no trial is in progress, the trial top screen shown in FIG. 22 is displayed.

When the player has selected the item "trial list" on the trial top screen (see FIGS. 21 and 22), a trial list screen is displayed. FIG. 23 is a view showing an example of the trial list screen. As shown in FIG. 23, a trial list and the number of times that the trial list can be updated are displayed on the trial list screen. When the player has selected the item "list update" on the player list screen, the trial list currently displayed is updated, and a new trial list is displayed. The number of times that the trial list can be updated is decremented by one. Specifically, update of the trial list is limited. For example, the player is allowed to update the trial list three times a day. When the player has selected an arbitrary trial in the trial list, a trial description screen is displayed.

FIG. 24 is a view showing an example of the trial description screen. As shown in FIG. 24, a detailed explanation (achievement condition) of the selected trial and a message that asks the player whether or not to challenge the trial are displayed on the trial description screen. When the player has selected the item "challenge" on the trial description screen, the trial period starts.

When the player has selected an arbitrary trial on the trial list screen when another trial is in progress, a trial description screen shown in FIG. 25 is displayed. FIG. 25 is a view showing another example of the trial description screen. As shown in FIG. 25, a detailed explanation (achievement condition) of the selected trial and a message that asks the player whether or not to cancel the trial in progress and challenge the selected trial are displayed on the trial description screen. When the player has selected the item "challenge" on the trial description screen, the trial in progress is canceled, and the trial period of the selected trial period starts.

Game Server

Figure 26:
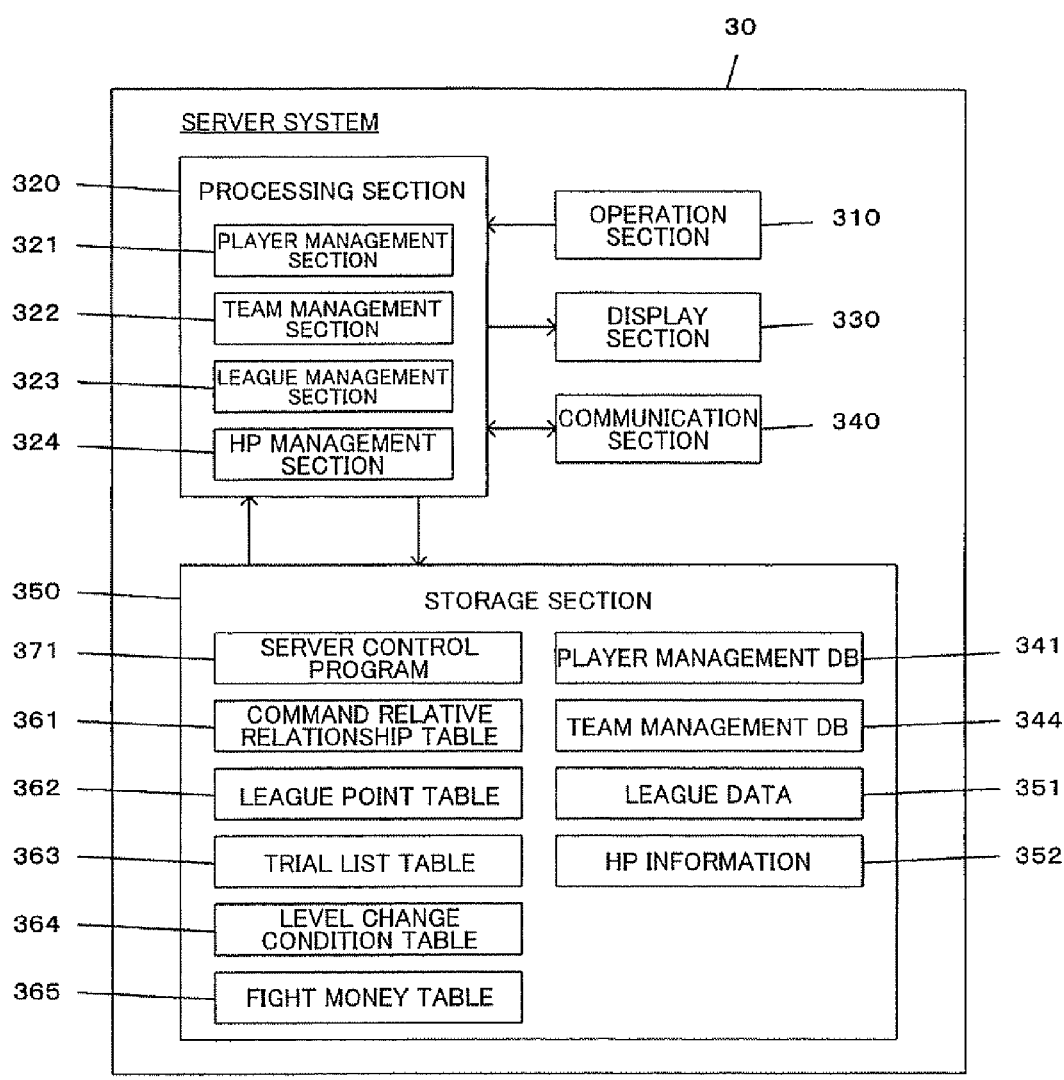
FIG. 26 is a view showing the functional configuration of a server system.

FIG. 26 is a block diagram showing the functional configuration of the server system 30. As shown in FIG. 26, the server system 30 includes an operation section 310, a processing section 320, a display section 330, a communication section 340, and a storage section 350.

The operation section 310 receives operation instructions from the administrator of the server system 30, and outputs an operation signal corresponding to the operation to the processing section 320. The function of the operation input section 310 is implemented by a button switch, a lever, a dial, a mouse, a keyboard, a touch panel, various sensors, and the like.

The processing section 320 controls the entire server system 30 based on a program and data stored in the storage section 350, the operation signal input from the operation section 310, data received from an external device (mainly the game device 10) through the communication section 340, and the like. The function of the processing section 320 is implemented by a calculation device such as a CPU (CISC or RISC) or an ASIC (e.g. gate array) and its control program, for example. In this embodiment, the processing section 320 includes a player management section 321, a team management section 322, a league management section 323, and an HP management section 324.

Figure 27:
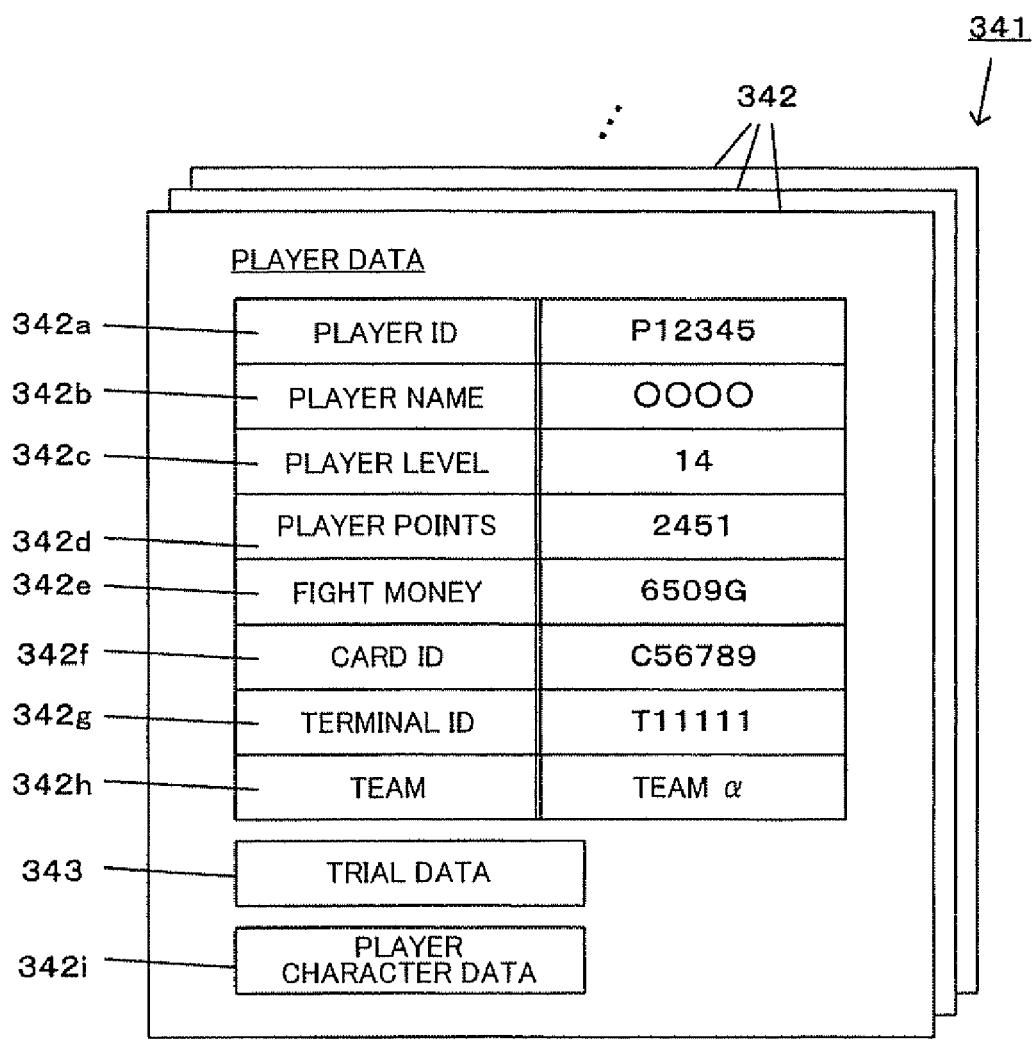
FIG. 27 shows a data configuration example of a player management DB.

The player management section 321 manages the player registered in the game system 1. Data relating to the registered player is stored in a player management DB 341. FIG. 27 shows an example of the player management DB 341. As shown in FIG. 27, the player management DB 341 stores a plurality of pieces of player data 342 relating to a plurality of players. A player ID 342a, a player name 342b, a player level 342c, player points 342d, fight money 342e, a card ID 342f of the game card 20 possessed by the player, a terminal ID 342g of the player terminal 50 possessed by the player, a team 342h to which the player belongs, trial data 343, and player character data 342i are stored as the player data 342.

The trial data 343 is data relating to the trial selected by the player. FIG. 28 shows an example of the data configuration of the trial data 343. As shown in FIG. 28, a trial list update count 343a, a trial in progress 343b, an effective period 343c, trial list data 343d, and trial history data 343h are stored as the trial data 343. The list update count 343a indicates the number of times that the trial list has been updated in one day. A rank 343e, a trial 343f, and a status 343g are stored as the trial list data 343d. The status 343g stores a value that indicates whether the corresponding trial is not selected, is in progress, has been canceled, or has been cleared. The trial history data 343h includes data that indicates the trial list that has been generated and the trial that has been cleared/canceled.

Data relating to all trials provided in advance is stored in a trial list table 363. FIG. 29 shows an example of the data configuration of the trial list table 363. As shown in FIG. 29, a trial ID 363a, a trial name 363b, a clear condition 363c, and a rank 363d are stored in the trial list table 363.

When player-related information is requested from the game device 10, the player management section 321 transmits the player-related information to the game device 10. Specifically, the player management section 321 specifies the player corresponding to the requested player-related information and the team to which the player belongs, and transmits data including 1) the player data 342 corresponding to the specified player, 2) the current calculation coefficients N1 and N2 of the specified team, and 3) the team points of each team in the league in the current interval to the game device 10 as the player-related information.

Figure 30:
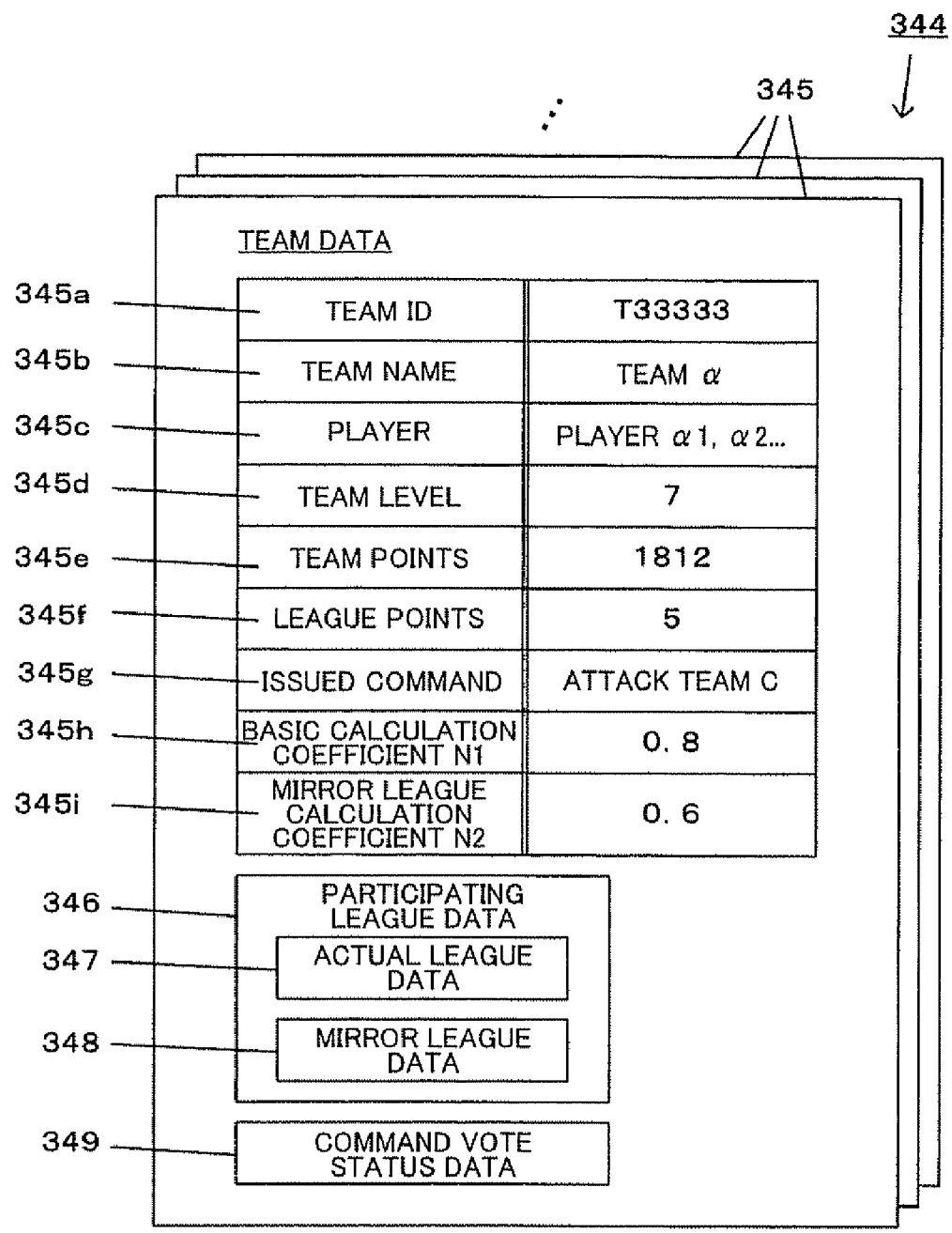
FIG. 30 shows a data configuration example of a team management DB.

Data relating to the team is stored in a team management DB 344. FIG. 30 is a view showing an example of the team management DB 344. As shown in FIG. 30, the team management DB 344 stores team data 345 corresponding to each team. A team ID 345a, a team name 345b, players 345c belonging to the team, a team level 345d, team points 345e, league points 345f, an issued team command 345g, a basic calculation coefficient (N1) 345h, a mirror league calculation coefficient (N2) 345i, participating league data 346, and command vote status data 349 are stored as the team data 345.

The participating league data 346 is data relating to the league in which the team participates. The participating league data 346 includes actual league data 347 relating to the actual league and mirror league data 348 relating to the mirror league. When the team does not participate in the mirror team, data that indicates that the team does not participate in the mirror team is stored as the mirror league data 348.

Figure 31:
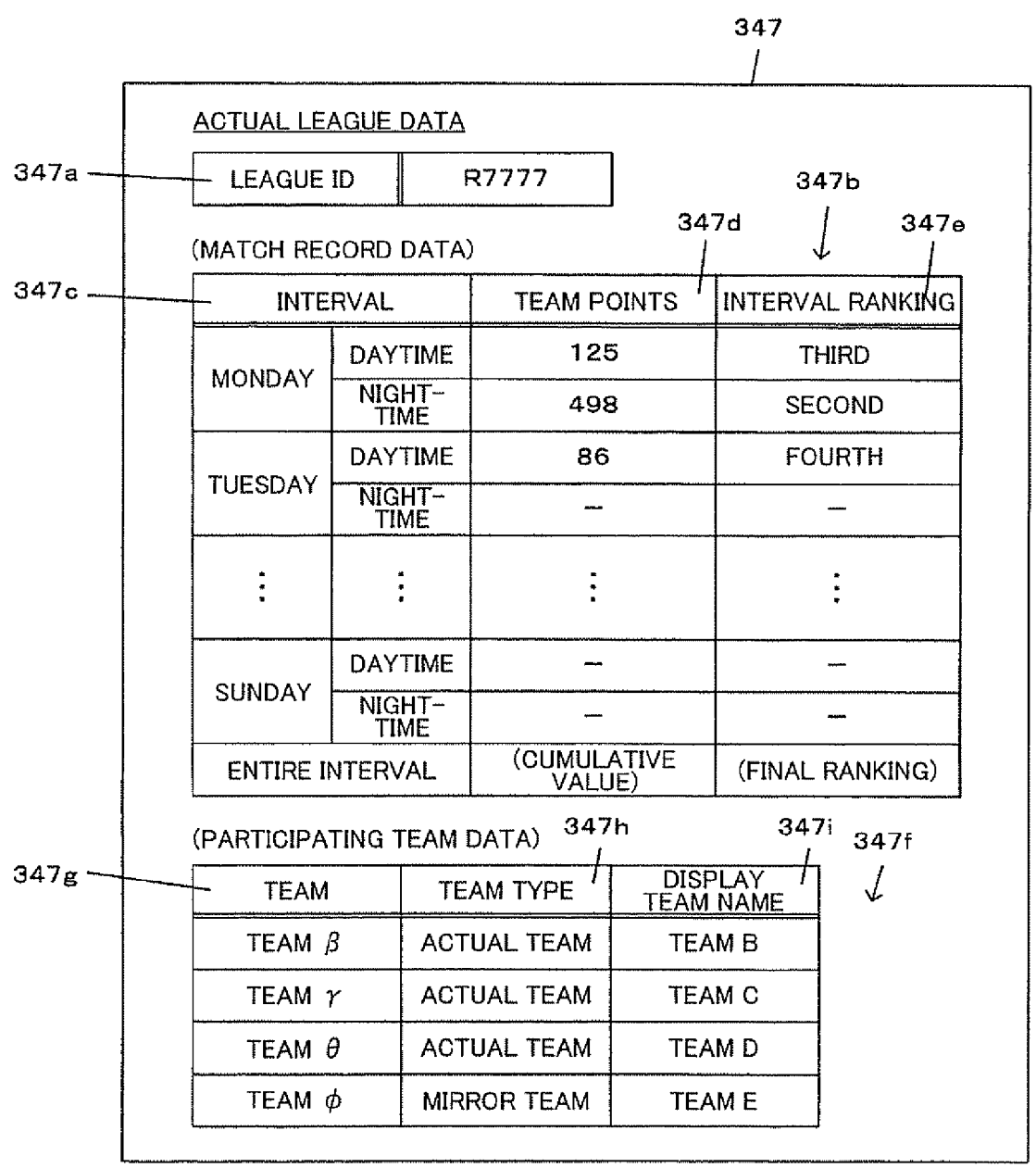
FIG. 31 shows a data configuration example of actual league data.

FIG. 31 shows an example of the data configuration of the actual league data 347. As shown in FIG. 31, an actual league ID 347a, match record data 347b, and participating team data 347f are stored as the actual league data 347. The match record data 347b is data relating to the match record of the team in the actual league. Team points 347d and an interval ranking 347e are stored as the match record data 347b corresponding to each interval 347c. The participating team data 347f is data relating to the team that participates in the actual league other than the team of the player. A team type 347h (actual team or mirror team) and a display team name 347i are stored as the participating league data 347f corresponding to each participating team 347g.

FIG. 32 shows an example of the data configuration of the mirror league data 348. As shown in FIG. 32, a mirror league ID 348a, match record data 348b, and participating team data 348f are stored as the mirror league data 348. The match record data 348b is data relating to the match record of the team in the mirror league. Team points 348d and an interval ranking 348e are stored as the match record data 348b corresponding to each interval 348c. The participating team data 348f is data relating to the team that participates in the mirror league other than the team of the player. A team type 348h and a display team name 348i are stored as the participating league data 348f corresponding to each participating team 348g.

Figure 33:
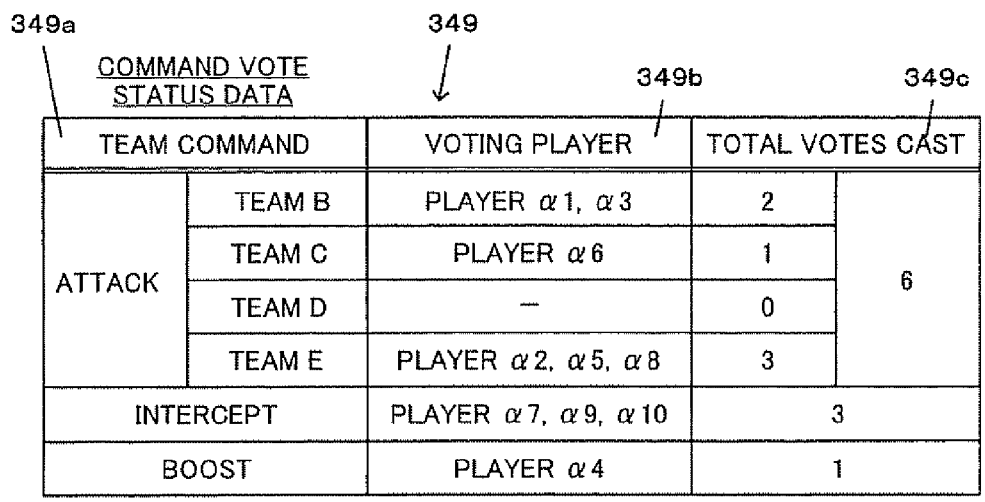
FIG. 33 shows a data configuration example of command vote status data.

The command vote status data 349 is data relating to the vote status of the team commands by the players belonging to the team. FIG. 33 shows an example of the data configuration of the command vote status data 349. As shown in FIG. 33, a voting player 349b and a total votes cast 349c are stored as the command vote status data 349 corresponding to each team command 349a.

When the player management section 321 has received player notification information transmitted from the game device 10, the player management section 321 updates the corresponding player data 342 and the like. The player notification information according to this embodiment is data transmitted from the game device 10 after the game ends, and includes 1) the player data updated based on the game results and 2) the team points obtained in the game. Specifically, the player management section 321 specifies the player, and updates the player data 342 relating to the specified player based on the received player data. When the player belongs to a team, the player management section 321 adds the received team points to the team points of the team of the player.

The team management section 322 manages each team. Specifically, the team management section 322 updates the team level of each team at a given time (e.g., 4:00 am before business hours) specified in advance. Specifically, the team management section 322 changes the team level of each team having a team level equal to or lower than "4" corresponding to the team points referring to a level change condition table 364.

Figure 34:
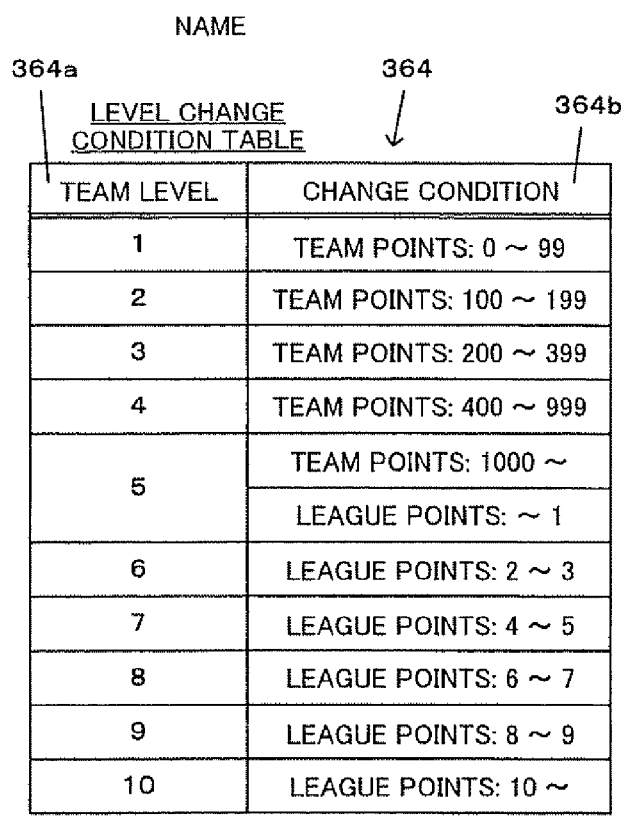
FIG. 34 shows a data configuration example of a level change condition table.

The level change condition table 364 is a data table that defines a team level change condition. FIG. 34 shows an example of the data configuration of the level change condition table 364. As shown in FIG. 34, a team level 364a and a change condition 364b are stored in the level change condition table 364. The change condition 364b is defined as a team point range when the team level is "1" to "5", and is defined as a league point range when the team level is "5" to "10". The team point range corresponding to the team level "5" is defined as the lower limit ("1000", in FIG. 29). The change condition corresponding to a team level equal to or higher than "5" is based on the league points.

The team management section 322 determines the team command issued by each team at a given time (e.g., 6:00 am before business hours) specified in advance. Specifically, the team management section 322 determines the team command which has been polled the largest number of votes to be the team command issued by each team referring to the command vote status data 349 stored as the team data 345. The team management section 322 then determines the calculation coefficient N of each team referring to a command relative relationship table 361 based on the determined team command of each team.

The command relative relationship table 361 is a data table that defines the success/failure relative relationship between the team commands. FIG. 35 shows an example of the data configuration of the command relative relationship table 361. As shown in FIG. 35, a success/failure condition 361b, success/failure 361c, a calculation coefficient N change target team 361d, and a calculation coefficient 361e are stored in the command relative relationship table 361 corresponding to each team command 361a.

The league management section 323 manages each league. Specifically, the league management section 323 forms a league employed in the league series held on the next day before the league series period (e.g., 4:00 am (before business hours) on the day before the league series starts). Specifically, the league management section 323 forms a league by matching teams having an identical team level equal to or higher than "5".

Specifically, the league management section 323 forms a league by matching five teams having a team level equal to or higher than "5" in the order from teams having the maximum team level "10" to teams having the lowest team level "5". Specifically, teams having the maximum team level "10" are matched (target group). When the number of teams in the target group is equal to or larger than five, five teams in the target group are matched. When the number of teams in the target group is less than five, teams having the team level "9" are added to the target group for matching. When some teams are not matched since the number of teams in the target group is not a multiple of five, mirror teams of the teams that are included in the target group and have been matched are added to the target group so that the league can be formed by five teams. When the teams included in the target group have been matched, teams having a lower team level are similarly matched as the target group.

Data relating to the league formed by the league management section 323 is stored as league data 351. FIG. 36 shows an example of the data configuration of the league data 351. As shown in FIG. 36, a league ID 351a, a participating team 351b, a team type 351c, and a team level 351c are stored as the league data 351 corresponding to each league.

The league management section 323 determines the final ranking of each league after the league series period has ended (e.g., 4:00 am (before business hours) on the final day of the league series). Specifically, the league management section 323 ranks each team that participates in each league based on the team points. The league management section 323 then changes the league points of each team corresponding to the determined league ranking referring to a league point table 362.

The league point table 362 is a data table that defines the amount of change in league points corresponding to league ranking. FIG. 37 shows an example of the data configuration of the league point table 362. As shown in FIG. 37, a league ranking 362a and a league point change amount 362b are stored in the league point table 362. The league point change amount 362b differs depending on the team type. The change amount is specified corresponding to the actual team and the mirror team. Specifically, the league point change amount of the mirror team is set to be smaller than the league point change amount of the actual team even if league ranking is identical. This is because the league points are mainly determined by the league ranking of the actual team (i.e., the effect of the league ranking in the mirror league is reduced).

The league management section 323 changes the team level of each team corresponding to the changed league points referring to the level change condition table 364.

The league management section 323 awards fight money corresponding to league ranking to the player who belongs to each team referring to a fight money table 365. The fight money table 365 is a data table that defines fight money obtained corresponding to league ranking. FIG. 38 shows an example of the data configuration of the fight money table 365. As shown in FIG. 38, league ranking 365a, a team level 365b, and fight money 365c are stored in the fight money table 365.

The HP management section 324 causes the server system 30 to function as a Web server, and maintains/manages a service site through the Internet based on HP information 352. The HP information 352 is information relating to the service site maintained by the server system 30 through the Internet. Specifically, the HP information 349 includes data relating to a page (homepage: HP) written in HTML, a CGI program, and the like.

When the HP management section 324 has received a service site access request from the player terminal 50, the HP management section 324 specifies the player terminal 50 and the player from the terminal ID received together with the request, and performs a login process. The HP management section 324 generates screen data for displaying a display screen (see FIGS. 15 to 25) corresponding to the player in response to the request from the player terminal 50 referring to the player data 342 relating to the specified player and the team data 345 relating to the team of the specified player, and transmits the screen data to the player terminal 50.

The HP management section 324 updates the player data 342 and the team data 345 in response to the request from the player terminal 50. Specifically, the HP management section 324 generates a new trial list in response to a trial list update request that is transmitted from the player terminal 50 when the player has selected the item "list update" on the trial list screen (see FIG. 23), for example. The new trial list includes trials other than the trials included in the previous trial list of the player.

The HP management section 324 starts the trial period of the requested trial in response to a trial challenge request that is transmitted from the player terminal 50 when the player has selected the item "challenge" on the trial description screen (see FIGS. 24 and 25), for example. When no trial is in progress, the HP management section 324 sets the effective period for the requested trial, and starts the trial period. When a trial is in progress, the HP management section 324 cancels the trial in progress, sets the effective period for the requested trial, and starts the trial period.

The HP management section 324 cancels the trial in progress in response to a trial cancellation request that is transmitted from the player terminal 50 when the player has selected the item "cancel" on the trial top screen (see FIG. 21), for example.

The HP management section 324 receives a team command vote in response to a team command vote request that is transmitted from the player terminal 50 when the player has selected the item "command vote" on the command vote screen (see FIG. 19), for example. Specifically, the HP management section 324 adds the player to the list of players (voting players) which have voted for the requested team command.

When the HP management section 324 has received a logout request from the player terminal 50, the HP management section 324 performs a logout process.

Again referring to FIG. 26, the display section 330 displays a display screen based on an image signal from the processing section 320. The function of the display section 330 is implemented by hardware such as a CRT, an LCD, an ELD, or a PDP.

The communication section 340 connects to the communication line N according to a control signal from the processing section 320, and performs data communication with an external device (mainly the game device 10). The function of the communication section 340 is implemented by a wireless communication module, a jack for a communication cable, a control circuit, or the like.

The storage section 350 stores a system program that implements a function that causes the processing section 320 to control the server system 30, a program and data necessary for implementing various functions according to this embodiment, and the like. The storage section 350 is used as a work area for the processing section 320, and temporarily stores the results of calculations performed by the processing section 320 according to various programs, data input from the operation section 310, and the like. The function of the storage section 350 is implemented by an IC memory, a hard disk, a CD-ROM, a DVD, an MO, a RAM, a VRAM, or the like. In this embodiment, the storage section 350 stores a server control program 371, the command relative relationship table 361, the league point table 362, the trial list table 363, the level change condition table 364, the fight money table 365, the player management DB 341, the team management DB 344, the league data 351, and the HP information 352.

Game Device

Figure 39:
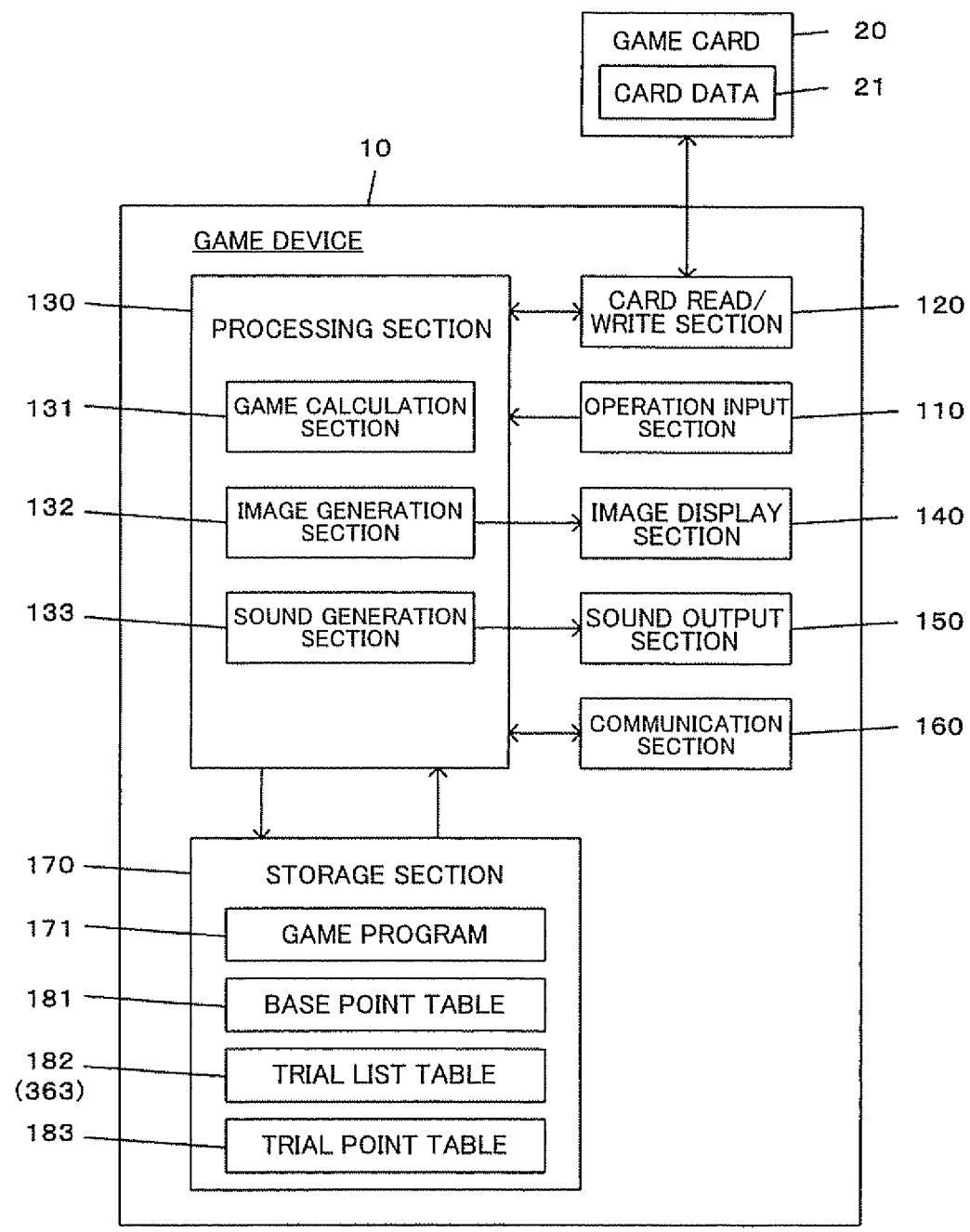
FIG. 39 is a view showing the functional configuration of a game device.

FIG. 39 is a block diagram showing the functional configuration of the game device 10. As shown in FIG. 39, the game device 10 includes an operation input section 110, a card read/write section 120, a processing section 130, an image display section 140, a sound output section 150, a communication section 160, and a storage section 170.

The operation input section 110 receives an operation instruction input from the player, and outputs an operation signal corresponding to the operation to the processing section 130. The function of the operation input section 110 is implemented by a button switch, a lever, a dial, a mouse, a keyboard, various sensors, and the like.

The card read/write section 120 reads card data 21 recorded in the game card 20 inserted into the game device 10, and outputs the card data 21 to the processing section 130. The card read/write section 120 writes data in the game card 20 inserted into the game device 10 according to instructions from the processing section 130 to update the card data 21 recorded in the game card 20.

FIG. 40 shows an example of the data configuration of the card data 21 recorded in the game card 20. As shown in FIG. 40, a card ID 21a of the game card 20, a player ID 21b, a player name 21c, a player level 21d, player points 21e, fight money 21f a team 21g, and player character data 21h of the player which possesses the game card 20 are stored as the card data 21.

The processing section 130 controls the entire game device 10, and executes various calculations for proceeding with the game and generating an image, for example. The function of the processing section 130 is implemented by a calculation device such as a CPU (CISC or RISC) or an ASIC (e.g. gate array) and its control program, for example. The processing section 130 includes a game calculation section 131 that mainly executes game calculations, an image generation section 132 that generates an image of a virtual three-dimensional space (game space) viewed from a given viewpoint such as a virtual camera based on various types of data calculated by the game calculation section 131, and a sound generation section 133 that generates game sound such as effect sound and background music (BGM).

The game calculation section 131 executes various game processes based on the operation signal input from the operation input section 100, a program and data read from the storage section 170, and the like. The game processes include setting a game space by disposing various objects in the virtual three-dimensional space, controlling a player character based on the operation signal from the operation input section 110, determining a hit between objects (hit check), controlling the viewpoint (virtual camera), and the like.

The game calculation section 131 executes a game process according to a game program 171. Specifically, the game calculation section 131 reads the card data 21 from the game card 20 inserted into the housing, and specifies the player based on the card data 21. The game calculation section 131 then requests the server system 30 to transmit player-related data relating to the specified player, and receives the player-related data transmitted from the server system 30 in response to the request. The game calculation section 131 selects CPU match or player match according to an operation instruction input by the player using the operation input section 110, and determines the opponent player. The game calculation section 131 then starts a match process between the player and the determined opponent player.

After completion of the match process, the game calculation section 131 calculates the player points and fight money awarded to the player based on the match result. The game calculation section 131 calculates the player points and fight money using a known method.

The game calculation section 131 calculates the team points obtained by the player based on the match result. Specifically, the game calculation section 131 calculates the base points referring to a base point table 181. The base point table 181 is a data table that defines the base points obtained as a result of a match.

FIG. 41 shows an example of the data configuration of the base point table 181. As shown in FIG. 41, the base point table 181 includes a match point table 181a, a win point table 181d, and a bonus point table 181g. A match type 181b and match points 181c are stored in the match point table 181a. A relative level difference 181e between the player and the opponent player and win points 181f are stored in the win point table 181d. The relative level difference 181e is a value obtained by subtracting the player level of the player from the player level of the opponent player when player match is selected. The relative level difference 181e is set at zero when CPU match is selected. A win condition 181h and bonus points 181i are stored as the bonus point table 181g.

The match points are obtained as a result of a match. The win points and the bonus points are obtained by winning a match. The win points and the bonus points are zero when the player has lost a match. Therefore, when the player has lost a match, the game calculation section 131 calculates the match points based on the match point table 181a as the base points. When the player has won a match, the game calculation section 131 calculates the sum of the match points based on the match point table 181a and the bonus points based on the base point table 181g as the base points.

The game calculation section 131 determines the presence or absence of a trial in progress of the player. When a trial in progress exists, the game calculation section 131 determines whether or not the trial has been cleared. The trial data is stored in a trial list table 182. The trial list table 182 is a data table that contains the same data as that of the trial list table 363 of the server system 30. When the game calculation section 131 has determined that the trial has been cleared, the game calculation section 131 determines the trial points referring to a trial point table 183.

The trial point table 183 is a data table that defines the trial points obtained by clearing a trial. FIG. 42 shows an example of the data configuration of the trial point table 183. As shown in FIG. 42, a trial rank 183a and trial points 183b are stored in the trial point table 183.

The game calculation section 131 multiplies the calculated base points by the calculation coefficient N1, adds the trial points to the resulting value, and determines the resulting value as the actual team points of the player. The came calculation section 131 multiplies the calculated base points by the calculation coefficient N2, adds the trial points to the resulting value, and determines the resulting value as the mirror team points of the player.

The game calculation section 131 updates the received player data based on the match result. The game calculation section 131 transmits the updated player data and the calculated team points to the server system 30 as the player notification information.

The game calculation section 131 causes the image display section 140 to display the after-match screen (see FIG. 13) that shows the team point status of each team that participates in an identical league based on the interval team points of each team included in the received player-related information. In this case, a value obtained by adding the calculated actual team points to the interval team points is displayed as the team points of the team of the player. The game calculation section 131 then updates the card data 21 recorded in the game card 20 based on the calculated player points, fight money, a determination result as to whether or not the trial has been cleared, and the like, and causes the game card 20 to be discharged from the housing.

The image generation section 132 generates a game image (3D CG image) for displaying a game screen based on the calculation results of the game calculation section 131, and outputs an image signal of the generated image to the image display section 140. The image display section 140 displays the game screen based on the image signal from the image generation section 132 while redrawing the screen of one frame every 1/60th of a second, for example. The function of the image display section 140 is implemented by hardware such as a CRT, an LCD, an ELD, a PDP, or an HMD.

The sound generation section 133 generates game sound such as effect sound and BGM used during the game, and outputs a sound signal of the generated game sound to the sound output section 150. The sound output section 150 outputs the game sound such as effect sound and BGM based on the sound signal from the sound generation section 133. The function of the sound output section 150 is implemented by a speaker or the like.

The storage section 170 stores a system program that implements a function that causes the processing section 130 to control the game device 10, a program and data necessary for causing the processing section 130 to execute the game, and the like. The storage section 170 is used as a work area for the processing section 130, and temporarily stores the results of calculations performed by the processing section 130 according to various programs, data input from the operation input section 110, and the like. The function of the storage section 170 is implemented by an IC memory, a hard disk, a CD-ROM, a DVD, an MO, a RAM, a VRAM, or the like. The storage section 170 also stores the game program 171 that causes the processing section 130 to function as the game calculation section 131, and game data. The game data includes the base point table 181, the trial list table 182, and the trial point table 183.

Process Flow (A) Server System 30

Figure 43:
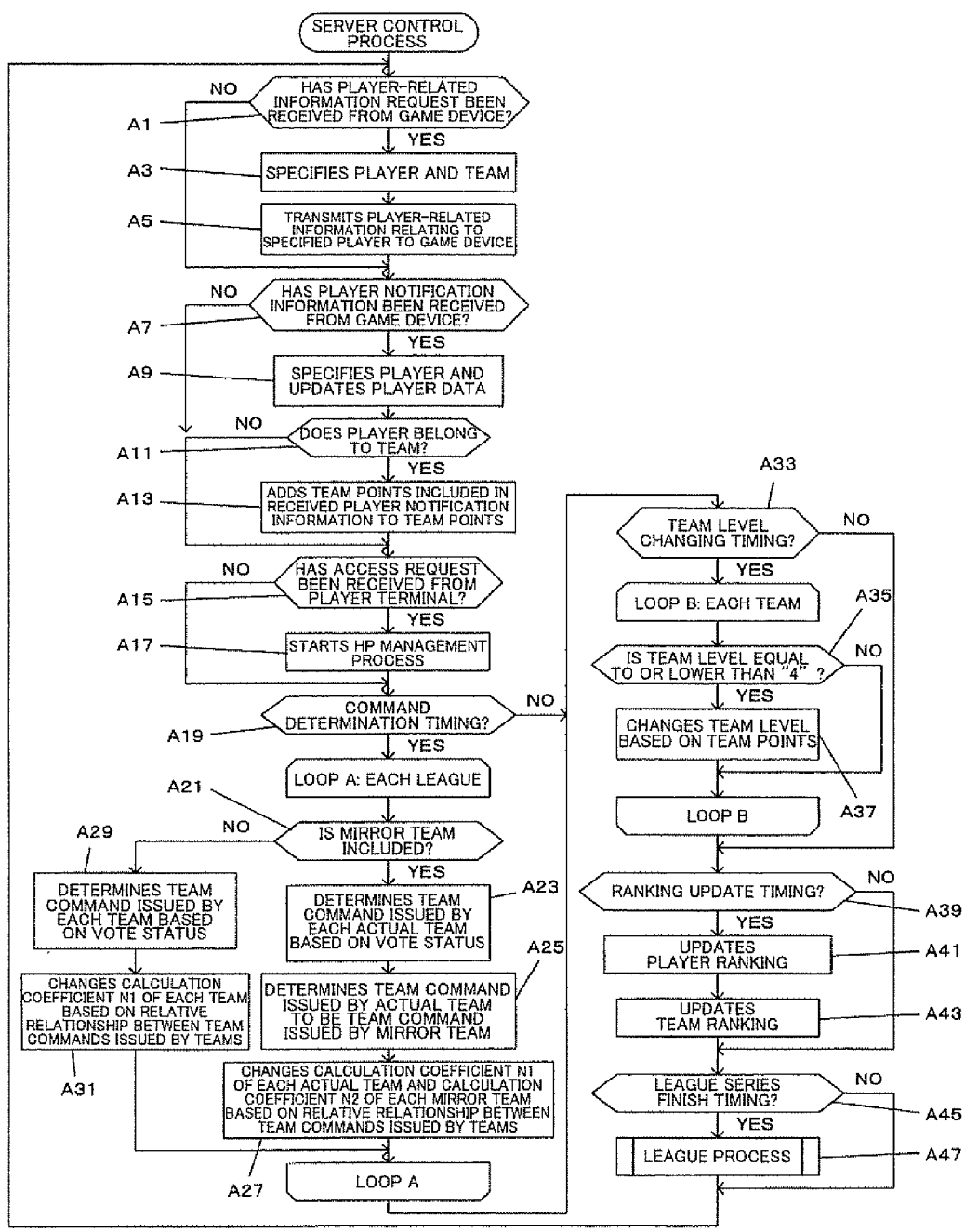
FIG. 43 is a flowchart showing a server control process.

FIG. 43 is a flowchart illustrative of a server control process executed in the server system 30. This process is implemented by causing the processing section 320 to execute the server control program 371. As shown in FIG. 43, when the server system 30 has received a player-related information request from the game device 10 (step A1: YES), the player management section 321 specifies the player corresponding to the player-related information and the team to which the player belongs (step A3). The player management section 321 generates player-related information including the player data 342 corresponding to the specified player, the calculation coefficients N1 and N2 of the specified team, and the interval team points of each team that participates in the same league, and transmits the player-related information to the game device 10 (step A5).

When the server system 30 has received the player notification information from the game device 10 (step A7: YES), the player management section 321 specifies the player corresponding to the player notification information, and updates the player data 342 relating to the specified player based on the player data included in the received player notification information (step A9). When the specified player belongs to a team (step A11: YES), the player management section 321 adds the actual team points included in the received player notification information to the team points of the team (step A13).

When the server system 30 has received an access request from the player terminal 50 (step A15: YES), the HP management section 324 starts an HP management process on the player terminal 50 (step A17). The HP management process is described later.

When a command determination timing specified in advance has been reached (step A19: YES), a loop A process is performed on each league. In the loop A, whether or not a mirror team is included in the target league is determined. When a mirror team is included in the target league (step A21: YES), the team management section 322 determines the team command which has been polled the largest number of votes to be the team command issued by each team corresponding to each actual team that participates in the target league (step A23). The team management section 322 determines the team command issued by the original actual team of the mirror team to be the team command issued by the mirror team (step A25). The team management section 322 changes the basic calculation coefficient N1 of the actual team and the calculation coefficient N2 of the mirror league based on the relative relationship between the team commands issued by the teams (step A27).

When a mirror team is not included in the target league (step A21: NO), the team management section 322 determines the team command which has been polled the largest number of votes to be the team command issued by each team corresponding to each team that participates in the target league (step A23). The team management section 322 then changes the basic calculation coefficient N1 of each team based on the relative relationship between the team commands issued by the teams (step A31). The loop A process is thus completed.

When a team level change timing specified in advance has been reached (step A33: YES), a loop B process is performed on each team. In the loop B, when the team level of the target team is equal to or lower than "4" (step A35: YES), the team management section 322 changes the team level of the target team based on the current team points of the target team according to the level change condition table 364 (step A37). The loop B process is thus completed.

When a ranking update timing specified in advance has been reached (step A39: YES), the player management section 321 ranks each player based on the current player points of each player, and updates player ranking (step A41). The team management section 322 ranks each team based on the current team points of each team, and updates team ranking (step A43).

When a league series finish timing specified in advance has been reached (step A45: YES), a league process is performed (step A47).

Figure 44:
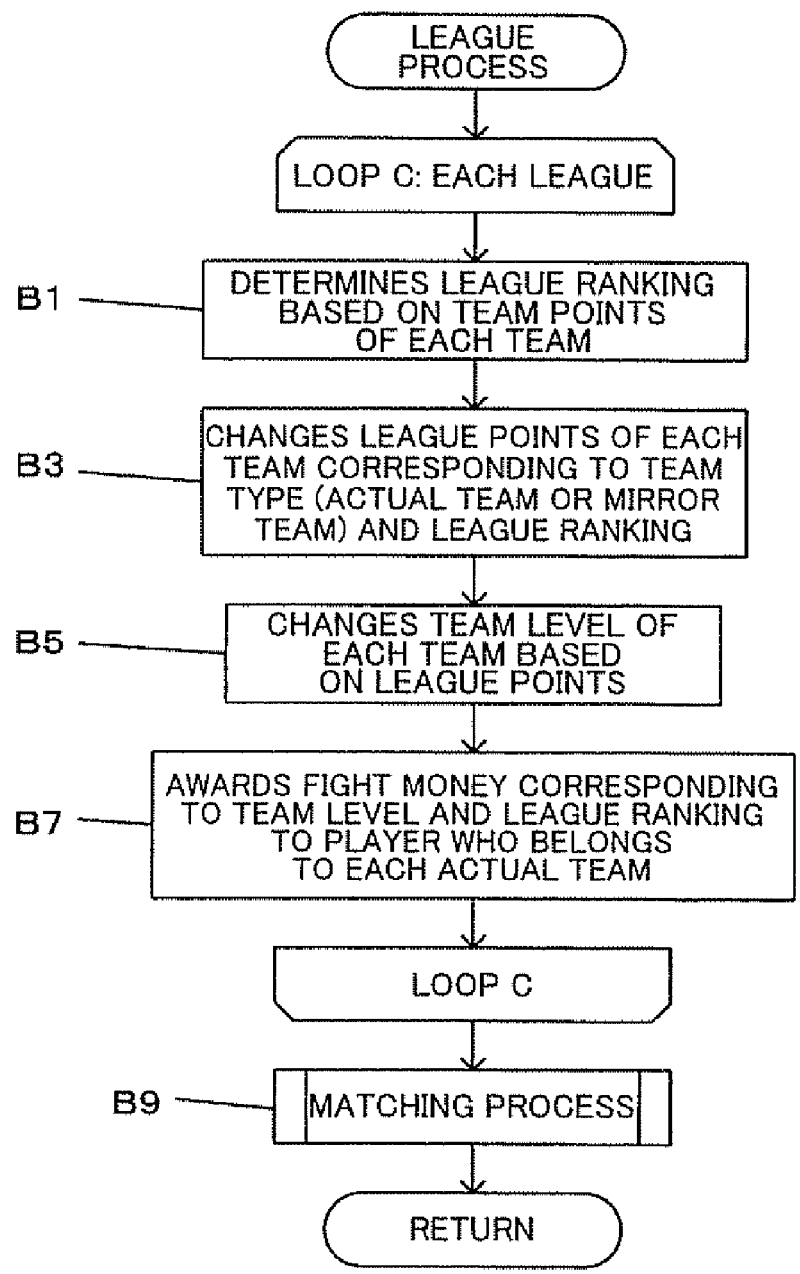
FIG. 44 is a flowchart showing a league process executed during the server control process.

FIG. 44 is a view illustrative of the league process. As shown in FIG. 44, a loop C process is performed on each league. In the loop C, the league management section 323 determines league ranking based on the team points of each team that participates in the target league (step B1). The league management section 323 then changes the league points of each team that participates in the target league corresponding to the team type (actual team or mirror team) and the league ranking (step B3). The league management section 323 chances the team level of each team corresponding to the league points changed by the league management section 323 (step B5). The league management section 323 awards fight money corresponding to the team level of the team and league ranking to the player who belongs to each actual team that participates in the target league (step B7). The loop C process is thus completed.

When the loop C process has been performed on all of the leagues, the league management section 323 forms a league by matching teams having a level equal to or higher than "5" (matching process) (step B9).

Figure 45:
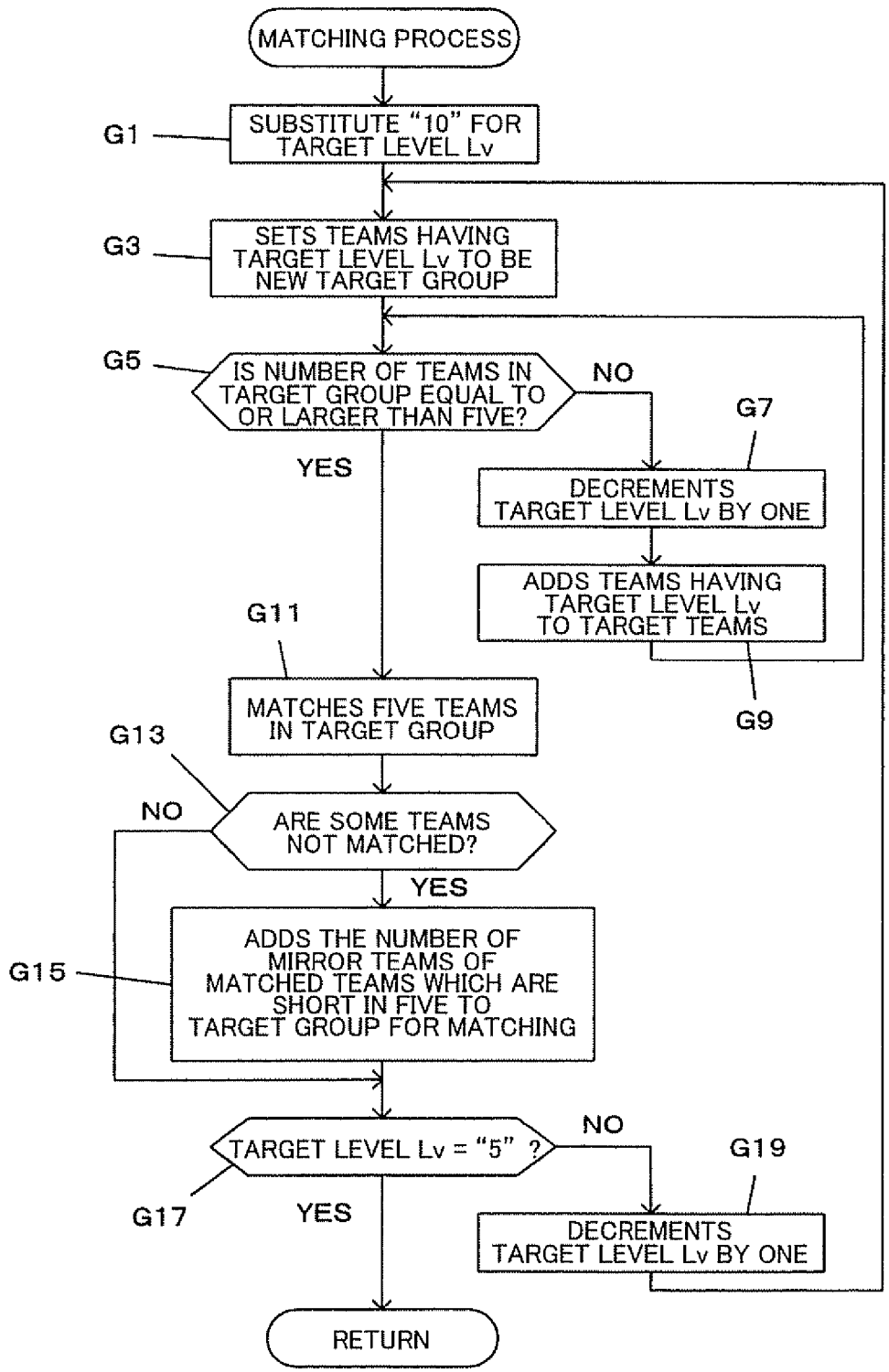
FIG. 45 is a flowchart showing a matching process.

FIG. 45 is a view illustrative of the matching process. As shown in FIG. 45, the league management section 323 sets a target level Lv at "10" (i.e., the maximum team level of teams that can participate in the league series (step G1). The league management section 323 sets teams having the target level Lv to be a new target group (step G3). When the number of teams in the target group is less than five (step G5: NO), the league management section 323 decrements the target level Lv by one (step G7), and adds teams having the target level Lv to the target group (step G9). The league management section 323 then returns to the step G5.

When the number of teams in the target group is equal to or larger than five (step G5: YES), the league management section 323 forms a league by matching five teams in the target group (step G11). When some teams in the target group are not matched (step G13: YES), the league management section 323 selects teams that are included in the target group and have been matched, and adds mirror teams of the selected teams to the target group for matching (step G15).

The league management section 323 then determines whether or not the target level Lv is "5" (i.e., the lowest team level that allows participation in the league series). When the target level Lv is not "5" (step G17: NO), the league management section 323 decrements the target level Lv by one (step G19), and returns to the step G3. When the target level Lv is "5" (step G17: YES), the league management section 323 finishes the matching process.

After completion of the matching process, the league management section 323 finishes the league process, and returns to the step A1. The same process is repeated.

Figure 46:
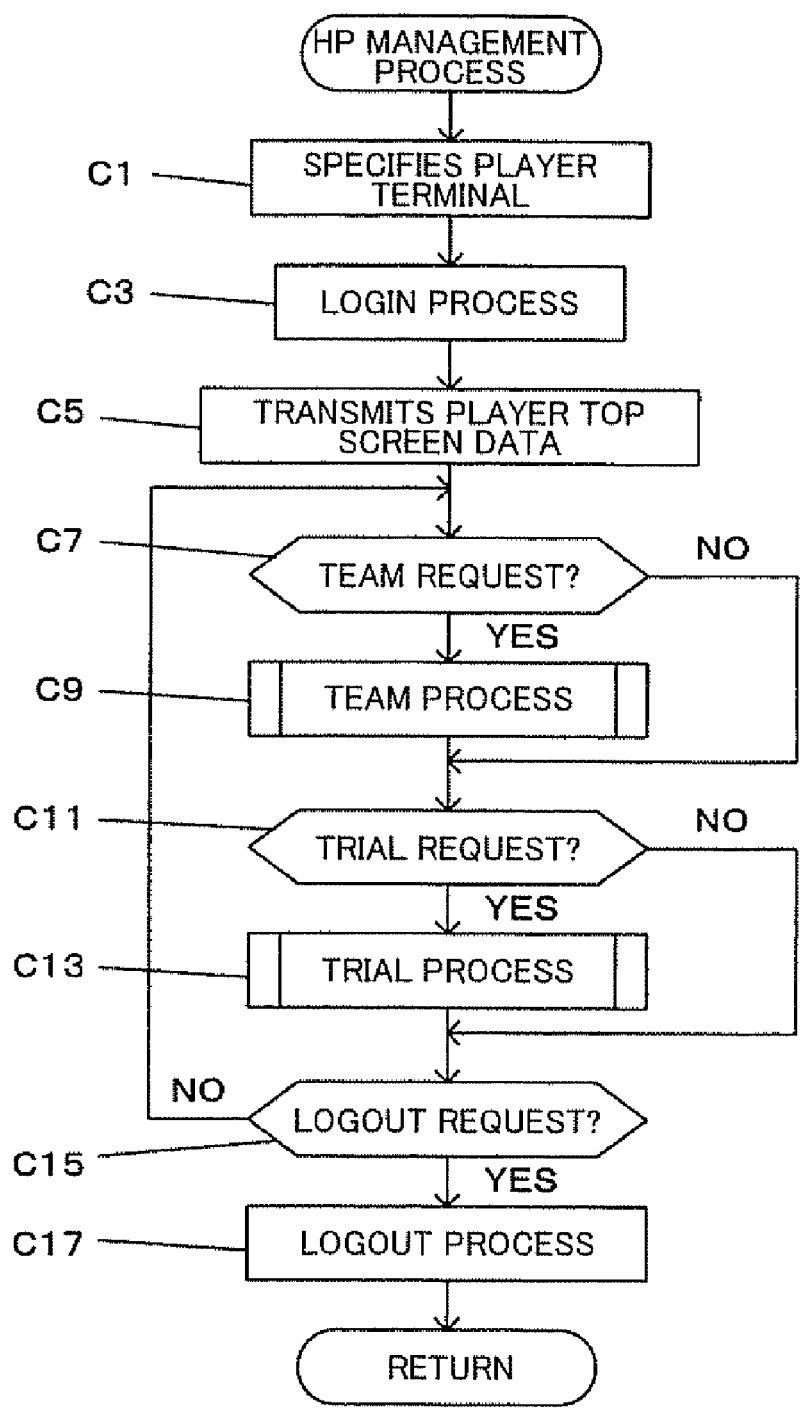
FIG. 46 is a flowchart showing an HP management process executed during the server control process.

FIG. 46 is a view illustrative of the HP management process. As shown in FIG. 46, the HP management section 324 specifies the player who possesses the player terminal 50 that has transmitted the access request, and performs the login process that authenticates the specified player (step C3). The HP management section 324 then generates the screen data for displaying the player top screen (see FIG. 15) for the player based on the player data 342 relating to the specified player, and transmits the screen data to the player terminal 50 (step C5).

When the server system 30 has received a team request from the player terminal 50 (step C7; YES), a team process is performed (step C9). The team request is transmitted from the player terminal 50 when the player has selected the item "team" on the player top screen (see FIG. 15), for example.

Figure 47:
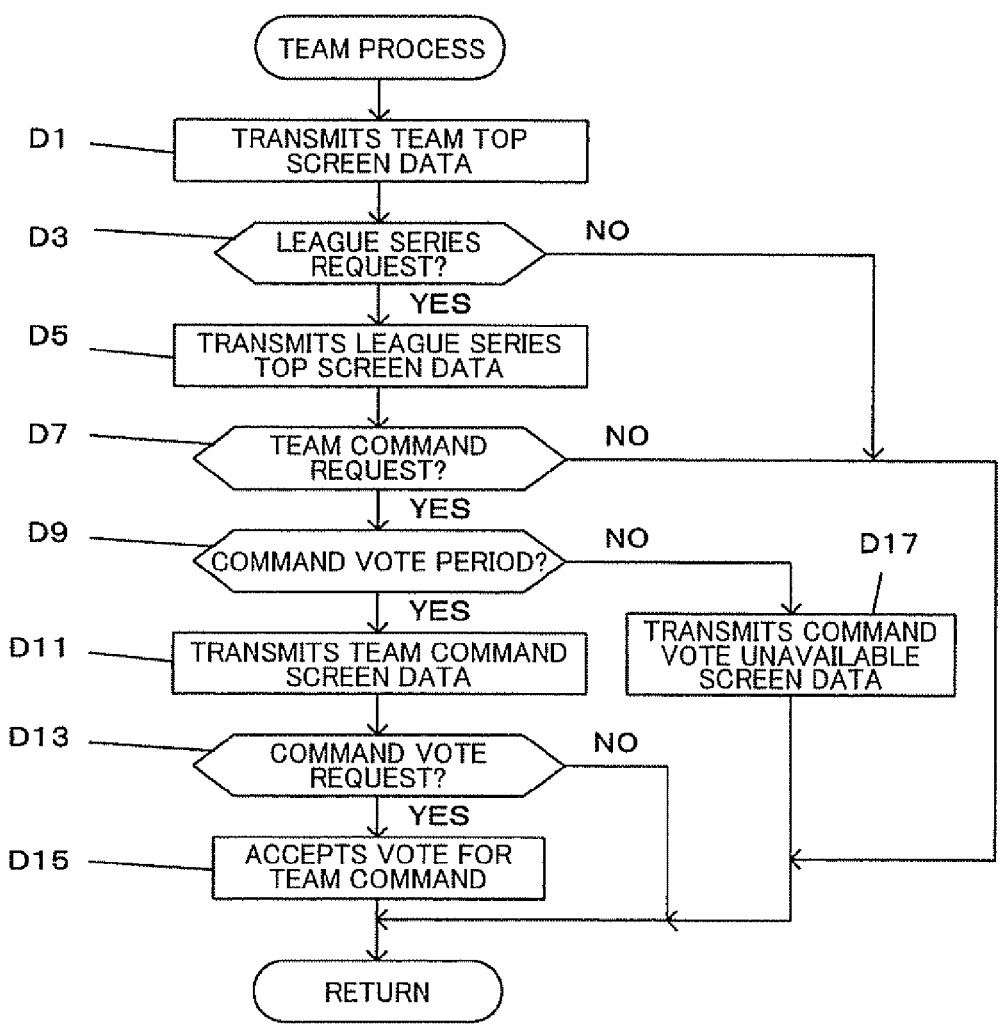
FIG. 47 is a flowchart showing a team process executed during the HP management process.

FIG. 47 is a view illustrative of the team process. As shown in FIG. 47, the HP management section 324 generates the screen data for displaying the team top screen (see FIG. 16) for the player based on the team data 345 relating to the team to which the player belongs, and transmits the screen data to the player terminal 50 (step D1).

When the server system 30 has received a league series request from the player terminal 50 (step D3: YES), the HP management section 324 generates the screen data for displaying the league top screen (see FIG. 17), and transmits the screen data to the player terminal 50 (step D5). The league series request is transmitted from the player terminal 50 when the player has selected the item "league series" on the team top screen, for example.

When the server system 30 has received a team command request from the player terminal 50 (step D7: YES), whether or not the current time is within the command vote period is determined. When the current time is within the command vote period (step D9: YES), the HP management section 324 generates the screen data for displaying the team command screen (see FIG. 18), and transmits the screen data to the player terminal 50 (step D11). When the server system 30 has received a team command vote request from the player terminal 50 (step D13: YES), a vote for the team command is accepted (step D15). When the current time is not within the command vote period (step D9: NO), the HP management section 324 generates the screen data for displaying the command vote unavailable screen (see FIG. 20), and transmits the screen data to the player terminal 50 (step D17). The team process is thus completed.

When the server system 30 has received a trial request from the player terminal 50 (step C11: YES), a trial process is performed (step C9). The trial request is transmitted from the player terminal 50 when the player has selected the item "trial" on the player top screen (see FIG. 15), for example.

Figure 48:
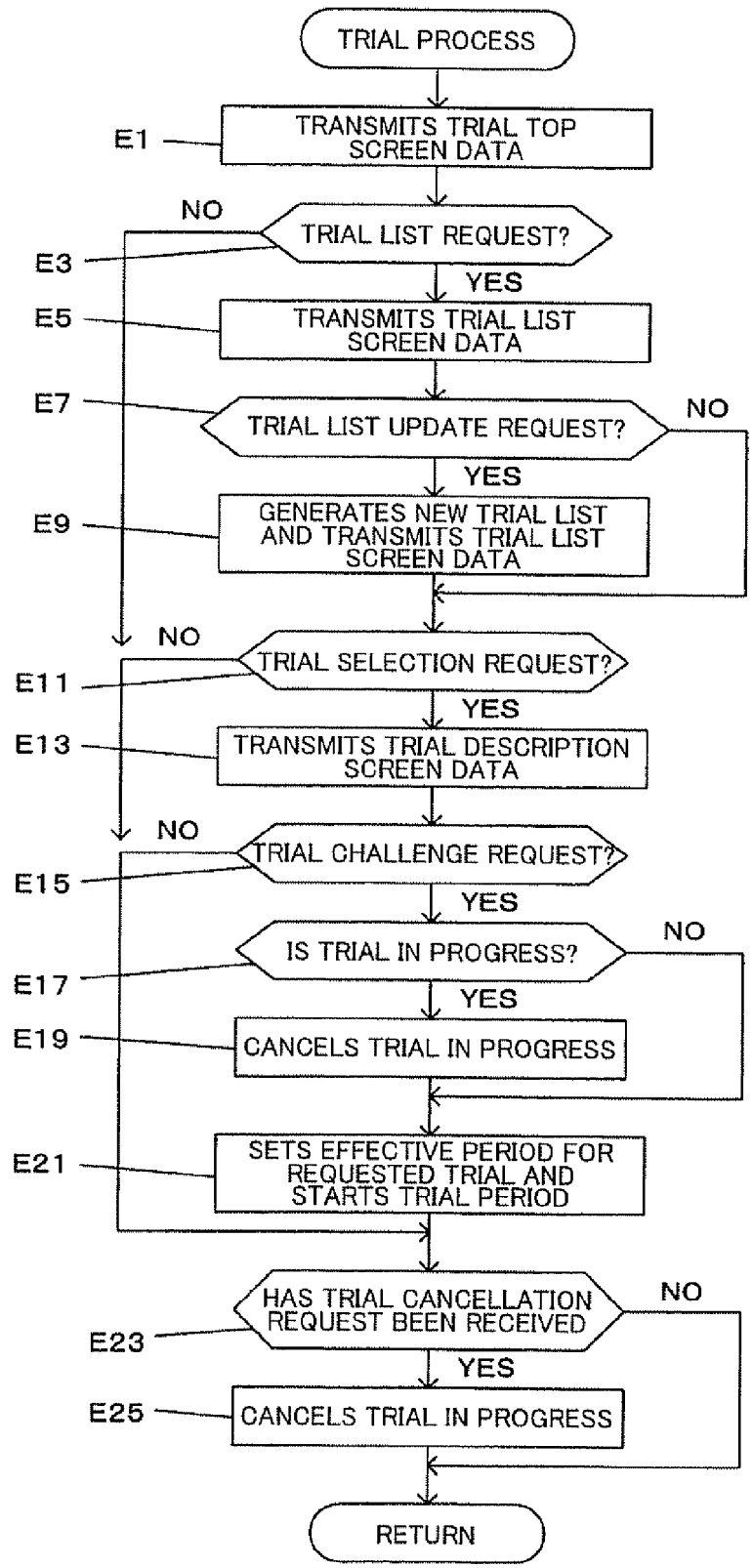
FIG. 48 is a flowchart showing a trial process executed during the HP management process.

FIG. 48 is a view illustrative of the trial process. As shown in FIG. 48, the HP management section 324 generates the screen data for displaying the trial top screen (see FIGS. 21 and 22) for the player based on the player data 342, and transmits the screen data to the player terminal 50 (step E1).

When the server system 30 has received a trial list request from the player terminal 50 (step E3: YES), the HP management section 324 generates the screen data for displaying the trial list screen (see FIG. 23) based on the player data 342, and transmits the screen data to the player terminal 50 (step E8). The trial list request is transmitted from the player terminal 50 when the player has selected the item "trial list" on the trial top screen (see FIGS. 21 and 22), for example.

When the server system 30 has received a trial list update request from the player terminal 50 (step E7: YES), the HP management section 324 generates a new trial list, generates the screen data for displaying the trial list screen, and transmits the screen data to the player terminal 50 (step E9).

When the server system 30 has received a trial selection request from the player terminal 50 (step E11: YES), the HP management section 324 generates the screen data for displaying the trial description screen (see FIGS. 24 and 25) of the corresponding trial, and transmits the screen data to the player terminal 50 (step E13). The trial selection request is transmitted from the player terminal 50 when the player has selected an arbitrary trial on the trial list screen (see FIG. 23), for example.

When the server system 30 has received a trial challenge request from the player terminal 50 (step E15; YES), whether or not a trial is currently in progress is determined. When a trial is in progress (step E17: YES), the HP management section 324 cancels the trial in progress, sets the effective period for the requested trial, and starts the trial period (step E21). When no trial is in progress (step E17; NO), the HP management section 324 sets the effective period for the requested trial, and starts the trial period (step E21).

When the server system 30 has received a trial cancellation request from the player terminal 50 (step E23; YES), the HP management section 324 cancels the trial in progress (step E25). The trial process is thus completed.

After completion of the trial process, whether or not a logout request has been received from the player terminal 50 is determined. When a logout request has not been received from the player terminal 50 (step C15: NO), the process returns to the step C7. When a logout request has been received from the player terminal 50, a logout process that allows the player to log out is performed (step C17). The HP management process is thus completed.

(B) Game Device 10

Figure 49:
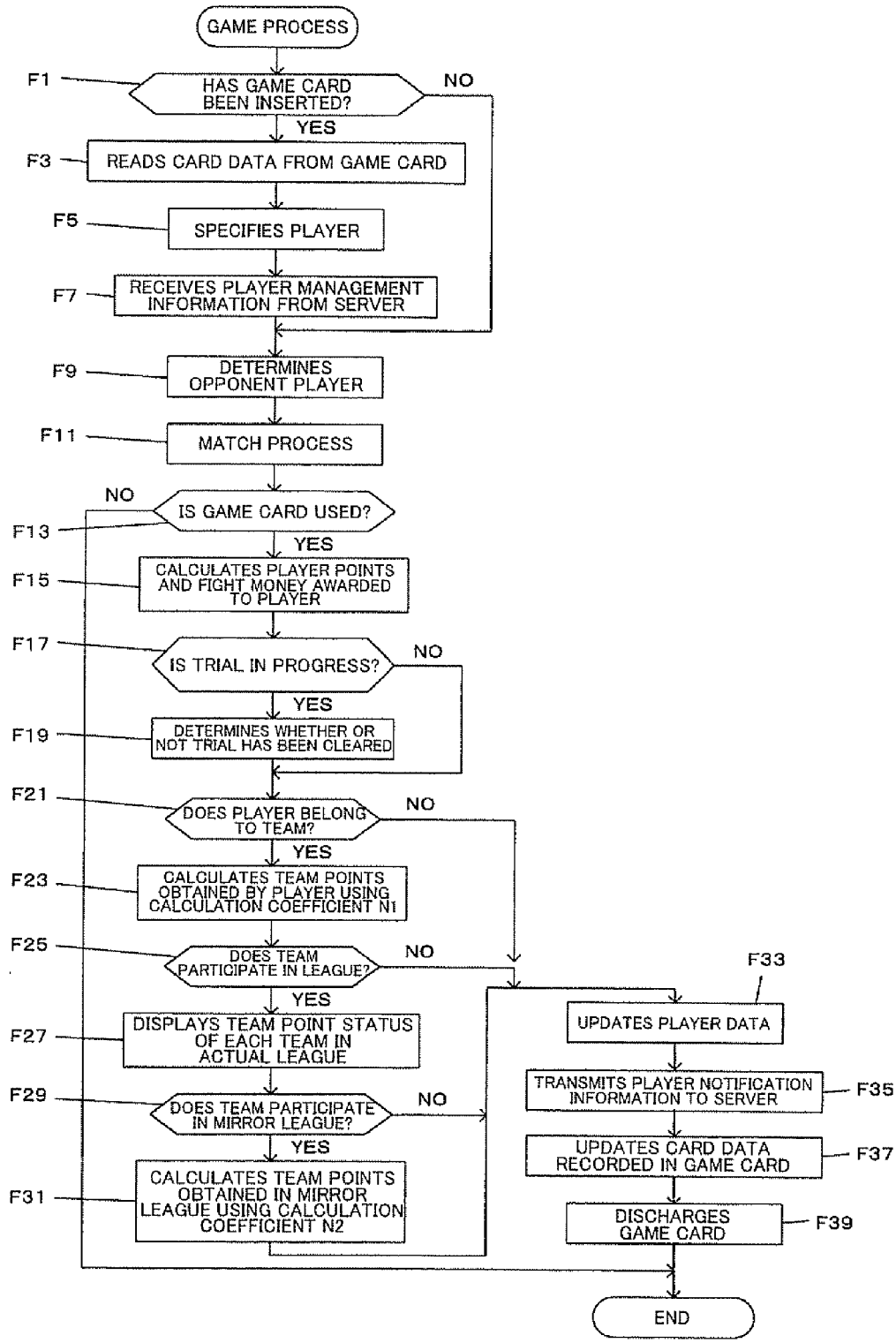
FIG. 49 is a flowchart showing a game process.

FIG. 49 is a flowchart illustrative of a game process executed by the game device 10. This process is implemented by causing the game calculation section 131 to execute the game program 171. As shown in FIG. 49, the game calculation section 131 determines whether or not the game card 20 has been inserted. When the game calculation section 131 has determined that the game card 20 has been inserted (step F1: YES), the game calculation section 131 reads the card data 21 from the game card 20 (step F3), and specifies the player based on the card data 21 (step F5). The game calculation section 131 then requests the server system 30 to transmit the player-related data relating to the specified player, and receives the player-related data transmitted from the server system 30 in response to the request (step F7). The game calculation section 131 then determines the match type (player match/CPU match) and the opponent player (step F9), and performs the match process between the player and the determined opponent player (step F11).

After completion of the match process, when the game card 20 is used (step F13: YES), the game calculation section 131 calculates the player points and fight money awarded to the player based on the match result (step F15). When a trial in progress exists (step F17: YES), the game calculation section 131 determines whether or not the trial has been cleared based on the match result (step F19).

When the player belongs to a team (step F21: YES), the game calculation section 131 calculates the team points obtained by the player based on the match result using the basic calculation coefficient N1 included in the received player-related information, a determination result as to whether or not the trial has been cleared, and the like (step F23).

When the team of the player participates in a league (step F25: YES), the game calculation section 131 displays the team point status of each team that participates in the league series based on the interval team points of each team that participates in the league series and the calculated team points included in the received player-related information (step F27).

When the team of the player participates in a mirror league (step F29: YES), the game calculation section 131 calculates the team points obtained by the player in the mirror league based on the match result using the mirror league calculation coefficient N2 included in the received player-related information and the like (step F31).

The game calculation section 131 then updates the player data included in the received player-related information (step F32). The game calculation section 131 transmits the updated player data and the calculated team points to the server system 30 as the player notification information (step F35).

The game calculation section 131 then updates the card data 21 recorded in the game card 20 based on the calculated player points, fight money, a determination result as to whether or not the trial has been cleared, and the like (step F37), and causes the game card 20 to be discharged from the housing (step F39). The game calculation section 131 thus completes the game process.

Modification

Embodiments to which the invention may be applied are not limited to the above-described embodiments. Various modifications and variations may be made without departing from the spirit and scope of the invention.

(A) League Series Participation Condition

The above embodiments have been described taking an example in which a team having a team level equal to or higher than "5" can participate in the league series. Note that other conditions may be additionally provided. For example, a team point update condition is provided. Specifically, whether or not the team point update count within a given period (e.g., within one month) is equal to or more than a given number (e.g., once), or whether or not the team point update frequency within three months after the team has been formed or the team level has reached "5" is equal to or more than a given frequency (e.g., twice/month), may be specified as a condition.

(B) Calculation of Team Points

The above embodiments have been described taking an example in which the game device 10 calculates the team points obtained by the player as a result of game play. Note that the server system 30 may calculate the team points obtained by the player. Specifically, when a match has ended, the game device 10 transmits match result data including the details of the match (e.g., the type and the occurrence time of the technique performed by the player character, a temporal change in the strength value of the player character, and the time when victory or defeat has been determined) to the server system 30. The server system 30 calculates the team points based on the match result data received from the game device 10. In this case, the server system 30 must store the base point table 181 and the trial point table 183.

(C) Order of Matching

The above embodiments have been described taking an example in which the teams are matched for league formation in the order from the teams that have the maximum team level and can participate in the league series. Note that the order of matching is not limited thereto. For example, when the number of teams increases as the team level increases, the teams may be matched in the order from the teams having the lowest team level.

(D) Grouping of Team Level

The above embodiments have been described taking an example in which the teams are matched in the order from the teams having the maximum team level "10" while setting the target group corresponding to the number of teams (i.e., the team levels are dynamically grouped while matching the teams). Note that the team levels may be grouped in advance. Specifically, the matching target team levels "5" to "10" may be grouped based on the number of teams so that the number of teams is equal to or larger than five (e.g., divided into a group having a team level of "5", a group having a team level of "6" or "7" and a group having a team level of "8" to "10"), and the matching process is then performed on each group.

(E) Another Matching Method

Figure 50:
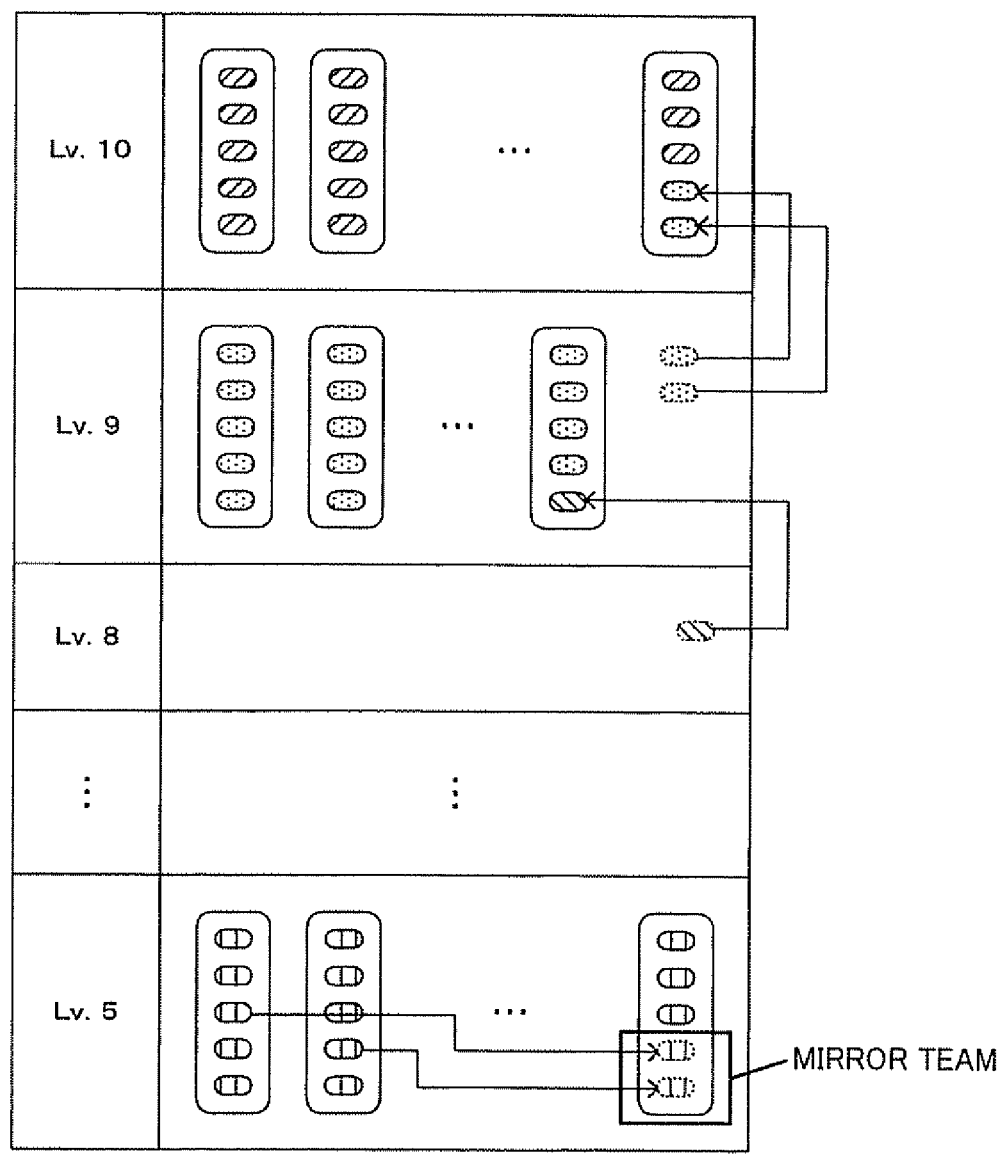
FIG. 50 is a view illustrative of another matching method.

The league may be formed by another matching method. For example, when the matching process is performed corresponding to each team level and some of the teams remain unmatched, as shown in FIG. 50, the teams having the higher or lower team level are added for matching.

Specifically, five teams having the maximum team level "10" are matched. When some of the teams remain unmatched since the number of teams is not a multiple of five, the teams having the team level "9" are added for matching.

Five teams having the team level "9" are then matched. When the number of teams is insufficient, the teams having the team level "8" are added for matching. When some of the teams having the team level "9" remain unmatched as a result of matching, mirror teams of the teams having the team level "5" that have been matched are added for matching.

(F) Game System

The above embodiments have been described taking an example in which the game system has a configuration in which a plurality of game devices 10 installed in each store is connected to the server system 30. Note that another configuration may also be employed. For example, the game device 10 may be a consumer game device, and the consumer game device may be connected to the server system via a communication line such as the Internet. The game device 10 may be a portable game device, a portable electronic instrument such as a PDA or a portable telephone, or a device having a communication function such as a personal computer.

(G) Type of Game

The above embodiments have been described taking an example in which the invention is applied to a fighting game. Note that the invention can also be applied to other games such as a car racing game and a quiz game.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An information processing method implemented by a server system connected to a game device via a communication channel, the game device getting a player identification information and executing a game, the information processing method comprising:

performing a matching process that matches teams to which one or more players belong to form a plurality of groups, each of the plurality of groups being formed by a given number of teams;

receiving the player identification information and notification information based on game play from the game device;

performing a team competition process that allows the teams included in each of the plurality of groups to compete based on the received notification information relating to each player belonging to each of the teams; and managing a team level of each of the teams while changing the team level of each of the teams based on a ranking of the teams included in each of the plurality of groups, the ranking being results of the team competition process, the matching process incorporating a mirror team of an actual team that belongs to another group in a group in which the number of teams is less than the given number;

the team competition process calculating the ranking of each of the teams included in each of the plurality of groups while regarding the actual team and the mirror team as different teams; and the managing of the team level changing the team level of the actual team based on the ranking of the teams included in each of a group to which the actual team belongs and a group to which the mirror team belongs when the mirror team has been incorporated.

2. The information processing method as defined in claim 1, the matching process forming the plurality of groups by matching teams having a team level that satisfies a given approximation condition.

3. The information processing method as defined in claim 1, the matching process and the team competition process being repeated at given intervals as a series of processes.

4. The information processing method as defined in claim 3, the game device including a point calculation section that calculates determination points based on game play results by a predetermined calculation process;

the notification information including at least the determination points; and the team competition process calculating the ranking of each of the teams in each of the plurality of groups based on a sum of the determination points included in the notification information corresponding to each of the teams.

5. The information processing method as defined in claim 4, further comprising:

selecting a team command corresponding to each of the teams from a plurality of team commands for which a success/failure relative relationship has been specified; and setting a calculation coefficient based on the team command selected corresponding to each of the teams and the success/failure relative relationship, the calculation coefficient being used when calculating the determination points, the point calculation section of the game device calculating the determination points of each of the teams based on the calculation coefficient;

the calculation coefficient being set while regarding the team command for the mirror team as the same as the team command for the actual team of the mirror team; and the team competition process calculating the ranking of each of the teams included in each of the plurality of groups based on the determination points of the actual team and the mirror team.

6. The information processing method as defined in claim 3, the team competition process including calculating determination points based on the notification information by a predetermined calculation process, and calculating the ranking of each of the teams in each of the plurality of groups based on a sum of the calculated determination points corresponding to each of the teams.

7. The information processing method as defined in claim 6, further comprising:

selecting a team command corresponding to each of the teams from a plurality of team commands for which a success/failure relative relationship has been specified; and setting a calculation coefficient based on the team command selected corresponding to each of the teams and the success/failure relative relationship, the calculation coefficient being used when calculating the determination points, the determination points of each of the teams being calculated based on the calculation coefficient;

the calculation coefficient being set while regarding the team command for the mirror team as the same as the team command for the actual team of the mirror team; and the team competition process calculating the ranking of each of the teams included in each of the plurality of groups based on the determination points of the actual team and the mirror team.

8. The information processing method as defined in claim 5, the team command corresponding to each of the teams being selected by a majority decision of the players belonging to each of the teams based on vote signals transmitted from player terminals of the players belonging to each of the teams.

9. The information processing method as defined in claim 4, the team competition process including calculating a subtotal of the determination points corresponding to each of the teams at intervals shorter than the given intervals; and the method further comprising transmitting a signal to the game device, the signal displaying a sum of the determination points on the game device in a latest interval in which the subtotal section calculates the subtotal of the determination points corresponding to each team in the group to which the team of a player identified by a player identification signal received by the player identification information reception section belongs as the actual team and/or the mirror team.

10. A server system connected to a game device via a communication channel, the game device getting a identification information and executing a game, the server system comprising:

a matching section that matches teams to which one or more players belong to form a plurality of groups, each of the plurality of groups being formed by a given number of teams;

a reception section that receives the player identification information and notification information based on game play from the game device;

a team competition processing section that performs a team competition process that allows the teams included in each of the plurality of groups to compete based on the notification information that has been received by the reception section and relates to each player belonging to each of the teams; and a team level management section that manages a team level of each of the teams while changing the team level of each of the teams based on a ranking of the teams included in each of the plurality of groups, the ranking being results of the team competition process, the matching section incorporating a mirror team of an actual team that belongs to another group in a group in which the number of teams is less than the given number;

the team competition processing section calculating the ranking of each of the teams included in each of the plurality of groups while regarding the actual team and the mirror team as different teams; and the team level management section changing the team level of the actual team based on the ranking of the teams included in each of a group to which the actual team belongs and a group to which the mirror team belongs when the mirror team has been incorporated.

* * * * *